United States Patent [19]

Sadashige

[11] 3,977,449

[45] Aug. 31, 1976

[54] PROCESS FOR PRODUCING SLICED VENEER

[76] Inventor: Takeshi Sadashige, 712-5, Ugai-cho, Fuchu, Hiroshima, Japan

[22] Filed: Mar. 18, 1974

[21] Appl. No.: 452,267

Related U.S. Application Data

[63] Continuation-in-part of Ser. No. 379,962, July 17, 1973, Pat. No. 3,878,016.

[30] Foreign Application Priority Data

| Sept. 17, 1973 | Japan | 48-103751 |
| Oct. 3, 1973 | Japan | 48-111779 |
| Oct. 30, 1973 | Japan | 48-121190 |
| Nov. 26, 1973 | Japan | 48-131801 |
| Nov. 28, 1973 | Japan | 48-134071 |
| Dec. 12, 1973 | Japan | 48-139458 |
| Dec. 15, 1973 | Japan | 48-140660 |

[52] U.S. Cl. ............... 144/316; 144/309 L; 144/314 R; 144/326 R; 156/256
[51] Int. Cl.² .......................................... B32B 31/18
[58] Field of Search ............ 144/309 R, 309 L, 313, 144/314 R, 314 A, 315 R, 316, 3 R, 1 R, 41, 134 R, 136 R, 326 R, 323; 156/256, 254, 255, 264, 330, 331, 335, 63; 161/37, 290, 146

[56] References Cited
UNITED STATES PATENTS

| 2,772,197 | 11/1956 | Kozdemba | 144/309 R |
| 3,076,738 | 2/1963 | Uschamnn | 16/255 X |
| 3,322,872 | 5/1967 | Slosberg | 156/264 X |
| 3,580,760 | 5/1971 | Koch | 156/264 X |
| 3,669,789 | 6/1972 | Utsugi et al. | 15/254 X |
| 3,684,641 | 8/1972 | Murphy | 161/146 X |
| 3,736,797 | 5/1973 | Jensen | 156/254 X |
| 3,779,794 | 12/1973 | DeSantis | 156/331 X |

FOREIGN PATENTS OR APPLICATIONS

| 932,035 | 7/1963 | United Kingdom | 156/264 |

Primary Examiner—Othell M. Simpson
Assistant Examiner—W. D. Bray
Attorney, Agent, or Firm—Frank J. Jordan

[57] ABSTRACT

In producing a sheet of wood veneer having a large area and elaborate designed wooden patterns adaptable for mass-production and adaptable to be made with various wood patterns, a log is sawn or sliced into a plurality of individual flitches which are smoothened on the surfaces to be glued and subsequently glued by adhesive to form a composite flitch. The composite flitch is subsequently sliced to form a sheet of wide wood veneer which may be glued to a substrate or a veneer by adhesive. Throughout the process, all steps are carried out while the wood is maintained at a moisture content more than the fiber saturation point of the wood.

19 Claims, 77 Drawing Figures

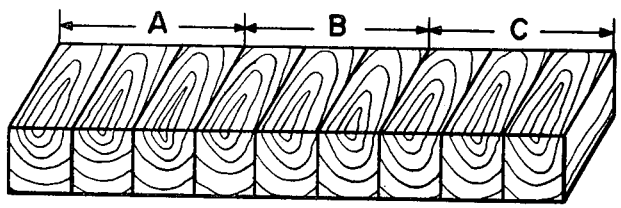
FIG. 20
FIG. 21
FIG. 22
FIG. 23
FIG. 24
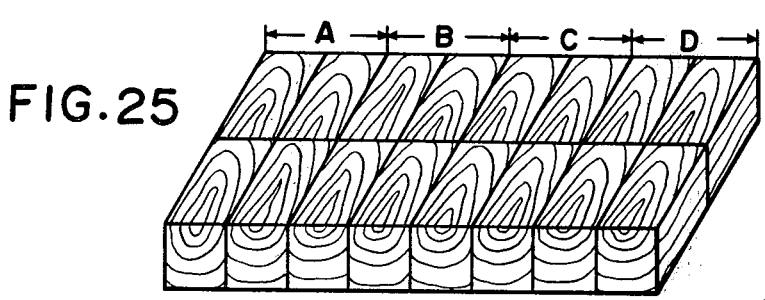
FIG. 25
FIG. 26

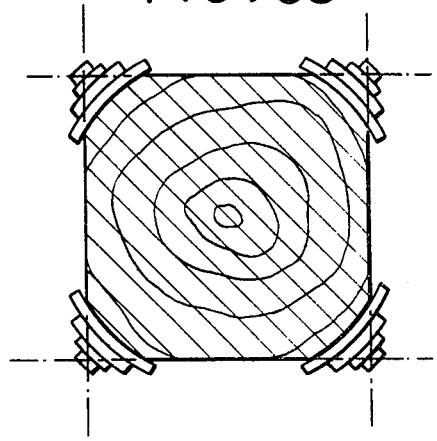
FIG. 58
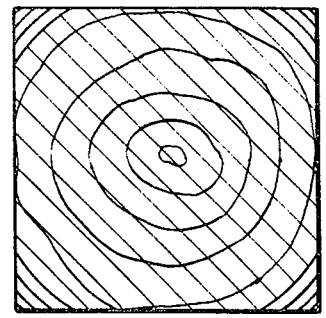
FIG. 59
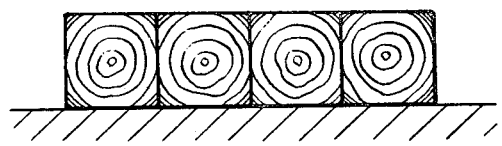
FIG. 60
FIG. 61
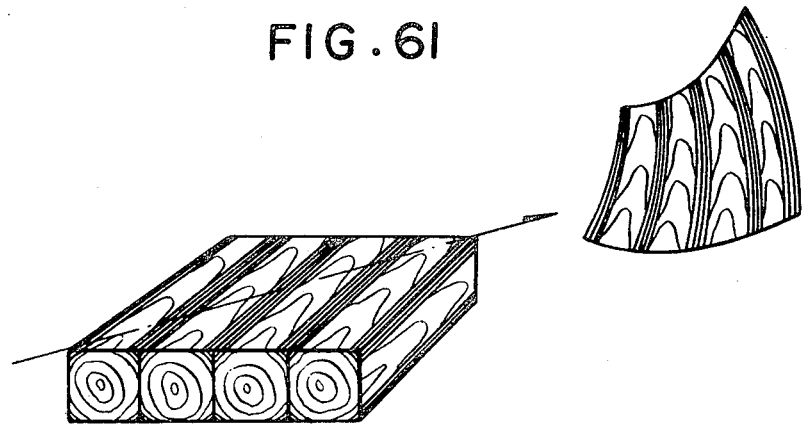

FIG. 69 FIG. 70 FIG. 71
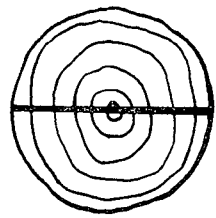
FIG. 72
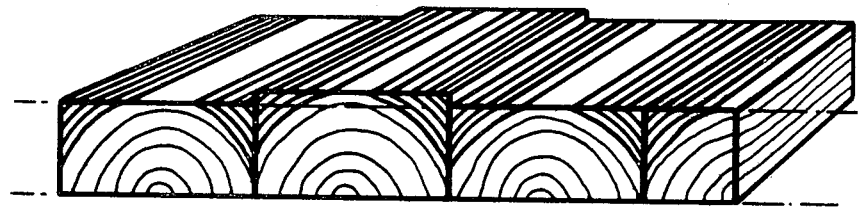
FIG. 77
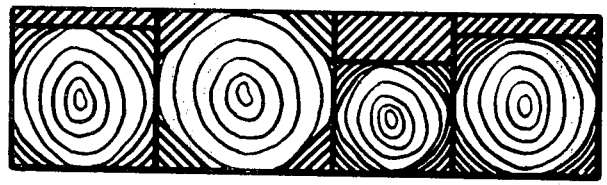

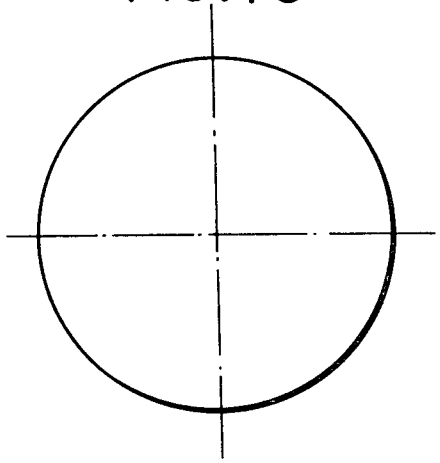
FIG.73
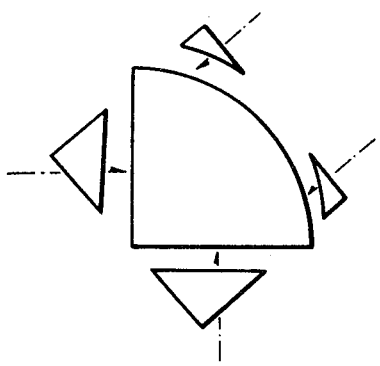
FIG.74
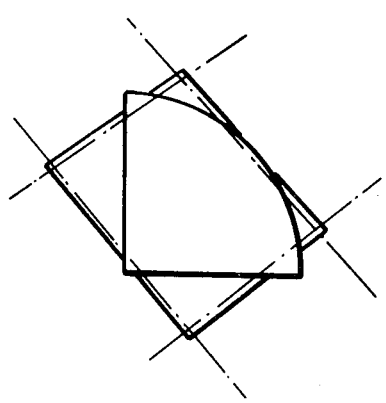
FIG.75
FIG.76
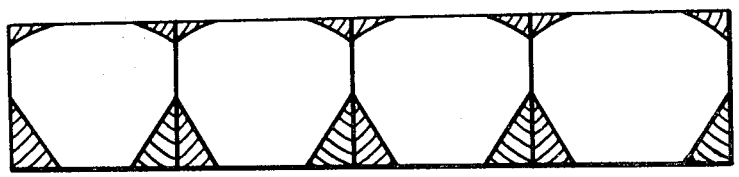

PROCESS FOR PRODUCING SLICED VENEER

This is a Continuation-in-Part application of copending U.S. patent application Ser. No. 379,962 filed July 17, 1973, now U.S. Pat. No. 3,878,016 issued April 15, 1975.

BACKGROUND OF THE INVENTION

The present invention relates to a process for the production of veneer and more particularly to a process for producing sheets of wide veneer to be applied to plywood and sheets of wide, thin veneer for producing fancy board (veneer-overlaid board) in one operational step.

In conventional processes for producing sliced wood veneer to be glued on a substrate or to be used for plywood, a log is longitudinally and transversely sawn into various-sized small flitches and they are subsequently sliced individually by means of a slicer or a rotary lathe into sheets of thin veneer. In this case, such small individual flitches in green condition can be sliced as they are, but when they are dry, they must be steamed or cooked for a long time before being sliced. The sheets of thinly sliced veneer thus produced are cut to have a suitable width by a guillotine or the like. And before gluing the sliced veneer onto a substrate, it is usual to dry and to correct unevenness on the surfaces of the sheets of veneer and to remove oil remaining thereon in the step of dividing and to effect a trimming and sorting into different lots having desired wood pattern.

According to this known process, however, the core timber $f$ and triangular sections $e$ of the logs (FIG. 1) wind up as scrap without being used in the sliced sheets of veneer. In addition, the sides of the wood, as mentioned above, are cut off and are unavailablly, so in other words, only about 40% of the original log can be really used as a material for veneer in spite of the great value of lumber. And more than that, those processes require drying and cooking or steaming which consume a great deal of fuel and electricity.

In addition, sliced sections of veneer are required to be patched onto the substrate or the veneer and have to be cut one by one by hand in a known method and to overlap or fill in the gap in the sheets of veneer. The patching step is also effected by hand. Under present conditions of such manufacture, it can be said that 80% of the labor required throughout the process must be assigned to this patching and mending work. Such inefficiency in conventional manufacturing processes makes it necessary to store the sliced veneers which are not used under severly controlled conditions to keep them from transforming, falling into decay, or getting moldy due to changes of moisture content.

On the other hand, such process of producing veneer from laminated wood has been employed in only a small percentage, that is only 1 to 2% of the total production of veneer. It also requires steps comprising sawing a log into flitches, drying, laminating the flitch by gluing, cooking (or steaming) and slicing the laminated flitch into sheets of veneer, and gluing each sheet onto a board. Furthermore, the flitch employed in the process is limited in size to less than 100 mm in thickness due to the following reasons:

1. A large flitch, e.g. 300 mm in thickness requires several days to some dozen days even by drying in a drier at a factory.

2. The adhering surfaces of a larger flitch cannot be smoothed by means of plane so as to be fitted overall the surface perfectly.

3. A larger flitch is apt to warp and/or distort in drying and cooking.

Thus, the defects in the conventional process hitherto used including using laminated woods are as follows:

1. It doubles time, labor, and cost, as it requires an extra drying step prior to gluing, and cooking prior to slicing or lathing.

2. It is apt to distort the wood due to drying and cooking, and will consequently lower the yield.

3. It requires a long cooking time (for example, 3 days at 80°–100°C), and it therefore requires a waterproof adhesive.

4. The use of resorcinol resin as a suitable waterproof adhesive results in leaving stains on the wood and distorts the wood.

5. It is impossible to use side and core parts of the wood, waste wood such as small timber, scrap timber and small diameter woods as raw logs.

Prior to the present invention, the inventor herein made various trials and experiments to find an improved method relating to mass-producing sliced veneers of wide area and making use of available lumber, taking into account the aforementioned defects of known processes.

As an example of the inventor's trials and experiments, original lumber or scrap timber was divided into a plurality or small rectangular solids or small flitches and joined together to form a laminated or composite flitch with waterproof adhesive after drying. The laminated flitch was next cooked so that it had a moisture content more than the fiber saturation point (hereafter called the $f.s.p.$) and then used in this trial. Swelling or shrinking also occurs within lumber as the moisture content therein changes to less than the $f.s.p.$. Additionally, since the degree of this phenomena depends among other things upon the direction of the flitch relative to the axis of the wood, difficulty as regards warp and distortion occured in the finished veneer on account of the inner stress arising in the joined parts.

Therefore, the advent of such process in the production of veneer as omitting extra drying and cooking of wood has been a dream to those skilled in the field of wood production. Such process carried out without drying and cooking of wood might have saved a great deal of labor and fuel, prevented the product from distortion caused by drying and cooking of wood, and consequently resulted in a great increase in the yield. However, such a process has not been available, as in which (1) wood is properly glued in the presence of moisture, (2) a suitable adhesive is employed, which cures to glue the flitches and sheets of veneer in the presence of moisture, and (3) the adhering surfaces of flitches larger in width and thickness are properly smoothed.

The present invention is outstanding in overcoming the above difficulties. Specifically, the present invention is concerned with a process for the production of sheets of veneer, which is characterized by the feature in that the entire process is carried out at the moisture content of the wood at or above the $f.s.p.$ and which process comprises sawing or slicing a log into individual flitches, smoothing and gluing with adhesive to form a composite or laminated flitch, and slicing the composite flitch into sheets of veneer in various desired widths which can be glued to a substrate or a veneer in a single operational step.

That is a new process has been devised in the form of an improved veneer with consideration being given to the fact that with a moisture content at or above the *f.s.p.*, lumber does not undergo the aforementioned phenomena of swelling or shrinking due to changes in the amount of the moisture content. In the improved process, according to the present invention, the flitches have no difficulties as mentioned above as regards to whether they are dry or moist. Thus, no inner stress is generated or produced at the joined parts between the flitches, so that no distortion, warp, or splitting will occur in the veneers sliced from the composite flitch according to the present invention.

Carrying out all the steps at the moisture content at or above the *f.s.p.* makes the following possible:

1. It makes the step of smoothing easy and effective before gluing and that it is necessary to conduct that step at such an elevated moisture content.
2. It suppresses the occurrence of the inner stress which would be frequently produced after the step of gluing. If one or two steps of those processes are conducted at the moisture content below the *f.s.p.*, change of the wood size takes place due to the differences of the kinds of wood, growing circumstance, and anisotropy, which afterwards causes them to warp by producing inner stress.
3. It makes them maintain the smoothness of the smoothed surface which is the most important condition for the step of gluing.

Then, the reason for the importance of such step as smoothing and close adhering for gluing or joining can be described as follows:

1. Otherwise, when the veneer for fancy board comes to be prepared, it is liable to produce gaps at the joining line into which invasion of the adhesive occurs and makes them soiled.
2. When a coating of paint, varnish, or resin is made after some sheets of veneer are glued to the substrate, it is liable to foam at the gap of the joining line, and makes them inmiscible with each other which prevents the close adherence of the paint, varnish or resin on to the veneer.

Furthermore, by making use of the aforementioned concept according to the present invention, any sheets of veneer or wide or large area can be made and overlaid over a substrate by a single operational step to form a fancy board having desirable patterns of wood grain and inconspicuous joint lines. Of course veneers of narrow area may also be produced as desired.

Still furthermore, by carrying out the process in accordance with this invention, any sheets of wide veneer having every sort and kind of pattern of grain, and evenness of such physical properties as the rate of shrinkage and the degree of splitting on overall the veneer can be available.

Therefore, a general object of the present invention is to provide a process for industrially mass-producing sliced veneer sheets having desirable patterns and inconspicuous joint-lines in large quantities and in which the veneer have a wide area large enough to cover over an entire substrate in a single operational step without troublesome mending or patching as was required in conventional gluing of sliced veneers.

Another object of the present invention is to provide a process for industrially mass-producing sliced veneers to be glued over an entire substrate in large quantities and in which the veneer is provided with desirable technological and esthetic patterns, for example checker patterns, mosaic patterns, compound patterns and so on formed by a combination of the flitches having various grain patterns of the wood.

A further object of the present invention is to provide a process for industrially mass-producing sliced veneers to be glued over an entire substrate in one operational step thereby reducing the amount of labor required.

Still another object of the present invention is to provide a process for industrially mass-producing a fancy board in a single operational step by gluing a sheet of sliced veneer or wide area onto a substrate, and without having to place in order a plurality of small sliced veneers on the substrate one by one as was required heretofore.

A still further object of the present invention is to introduce a process for the production of veneer, which is carried out efficiently without drying and cooking, and in which the fuel and electric power expenses are saved because of no drying and cooking steps required.

Still another object of the present invention is to introduce the process which is carried out at moisture contents at or above the *f.s.p.*, so as to prevent distortion or warp of the wood, and consequently to bring a high yield of sliced veneer from a raw log.

A still further object of the present invention is to provide a industrially mass-producing process in which larger flitches, 100–500mm or more in thickness can be smoothed on their adhering surfaces in one operational step which have not been able to be smoothed according to the conventional process.

Still another object of the present invention is to provide a process for industrially mass-producing wide sliced veneer sheets in which waste timber, small diameter wood, as well as side and core parts of the woods which have been impossible to be utilized for such purpose are made full use of according to this invention.

Other features which are considered as characteristic for the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope of equivalents of the claims.

SUMMARY OF THE INVENTION

A process for producing a sheet of wood veneer having a large area and elaborate designed wooden patterns adaptable for mass-production and adaptable to be made with various wood patterns includes sawing or slicing a log into a plurality of flitches, smoothing the surfaces of the flitches which are subsequently to be glued, applying an adhesive to the smoothed surfaces to be glued, gluing the flitches at the adhesive-bearing surfaces to form a composite flitch, and slicing the composite flitch to the desired thickness to produce a sheet of veneer, throughout the entire process above production of the sheet of veneer being carried out while maintaining the moisture content of the wood at or above the fiber satuation point.

BRIEF DESCRIPTION OF THE DRAWING

The construction and method of operation of the invention together with additional objects and advantages thereof will be best understood from the following description of specific embodiments when read in connection with the accompanying drawings, in which:

FIGS. 20 and 25 are a perspective view of a composite flitch as related to a ninth embodiment and FIGS. 21, 22, 23, 24 and 26 are respectively plan views indicating combination of flitches as related to the ninth embodiment

FIGS. 54, 55, 56, 57, 58, 59, 64, 65, 69, 70, 71, 73, 74, and 75 are respectively end views showing preparing of flitches and FIGS. 43, 46, 50, 61, 66, 67 and 72 are respectively perspective views indicating composite flitches and FIGS. 44, 45, 60, 68, 76, 77 are respectively end views indicating the same, as related to a thirteenth embodiment.

DETAILED DESCRIPTION OF THE INVENTION

Figure 1:
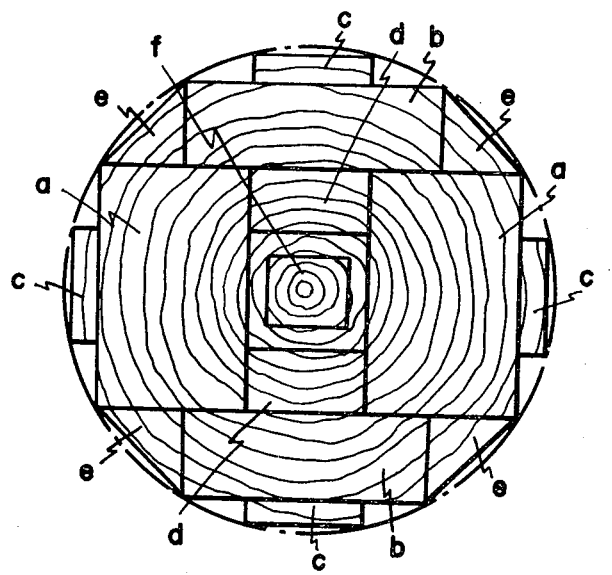
FIG. 1 is an end view showing the dividing arrangement of a log as related to a first embodiment of the present invention.

First refering to the process steps of the present invention, an original log is first sawed or sliced lengthwise and crosswise into small flitches. The work flitch herein used, substantially refers to a piece of wood having various sizes ranging from large squared timber to small rectangular prism which does not include board. However, it goes without saying that pieces belonging to the board can be used as auxiliary means in this invention.

All of the surfaces of the flitches are then smoothed so that such surfaces may correspond to mating surfaces to be closely glued with each other. Such smoothing is performed through the use of a plane, saw or slicer. As the saw herein used is such one as cross cutting circular saw with fine teeth and it is the characteristic of this invention to employ the saw or slicer in the step of smoothing for which only the plane has been hitherto used. The smoothed flitches are arranged to form a large laminated or composite flitch of the required size taking into account the desired pattern for the sliced veneer to be overlaid on a substrate or the veneer to be used for plywood.

As the step of gluing the flitches together, specified adhesive is applied to the surfaces to be mated to each other. A laminated flitch formed according to the aforementioned three steps is sliced into a sheet of veneer of desired thickness having patterns created by the grain of the wood, by using the slicer. Throughout the aforementioned process steps for providing sheets of sliced veneer, it is necessary that all steps be carried out while the moisture content is at or above the $f.s.p.$ As previously set forth, the $f.s.p.$ or fiber saturation point herein described, is a point representing the condition in which lumber contains a certain quantity of moisture therein. Moisture in lumber consists of free water which is contained in the opening of the cell such as cell vacuole and cell interval and is beyond the compass of attractive power of the micell and bound water which permeate into the cell membrane and usually is absorbed into the amorphous regions of the micell. When moisture in the lumber evaporates during drying, the bound water starts to evaporate after the free water has evaporated. The terms $f.s.p.$ described herein means the condition of moisture content wherein the cell membrane of the lumber is saturated with bound water after all the free water has evaporated. When further evaporation of moisture occurs beyond this point, the lumber starts to shrink and change physically. The moisture content at the $f.s.p.$ is about within the range of 25 to 35% depending on the kind of the wood.

Since the raw logs are cut down in green condition and sawed lenghwise and crosswise into flitches in that condition, the moisture contents of logs and flitches are usually kept at or above the $f.s.p.$ and the operation of each step in accordance with the present invention can be carried out successfully and effectively, at such moisture content as above the $f.s.p.$. However, when the logs, flitches or composite flitches are left in dry state for a long period of time or a kind of wood easily dried are used, these operations are preferably carried out in the workroom where a moisture content is kept more than the relative humidity of 95% by sprinkling water or blowing steam therein. Alternatively a moisture content can be kept high by spraying mist of water, blowing steam onto them or by immerging them in the water.

When the logs and flitches contain moisture at or above the $f.s.p.$, they are easy to be sawed or smoothed by means of sawing, planing or slicing at a stroke. After being smoothed individual flitch is arranged in the manner according to this invention which will be mentioned in the embodiment and joined by gluing using hydrophilic adhesive. Hydrophilic adhesives herein used, are preferably such adhesive as underwater curing type adhesive which is reactive with water and cured to develop adhesiveness. For example, among polyurethane resin, polyurethane adhesive of underwater curing type can be preferably used and besides any other underwater adhesive which is cured to develop adhesiveness by reacting with water are suitably employable. Alternatively, among epoxy resin adhesive, any adhesive capable of curing even in the presence of moisture such as moisture-curing epoxy resin adhesive together with polyamides or aromatic amine as curing agent can be recommended as the adhesive in this invention. These adhesive can be used at room temperature, but upon heating curing-period can be reduced to that extent. The amount of adhesive employed herein is usually in the range of 50–200g/m$^2$, applying pressure in the range of 4–8kg/cm$^2$, and curing-period is usually 1.5–10 hrs in the former case and about 24hrs in the latter case at room temperature. And such adhesives as resorcinol, phenol, melamine, urea and plyester types adhesive which can be cured in the presence of moisture are also usable. These adhesives may be mixed for use so long as they are compatible with each other.

In the present invention, in order to carry out the entire process at moisture content above the $f.s.p.$, it is essential to select desirable adhesive to be employed at the gluing step which cure and have satisfactory adhesive power does not change after drying. Other than the epoxy resin adhesive and the urethane polymer adhesive described above, any adhesive which cures or reacts in moist or wet condition or even in underwater state may be used according to this invention.

Further, there may be added to the adhesives, suitable dyestuffs, pigments or mixtures thereof for the purpose of shading and/or lining. In this case, dyestuff thus added diffuses in the direction of the axis of the flitch along the fiber texture and amorphous region due to the capillary phenomena or ionic absorption to provide shading to the cutting ends and the part adjacent thereto of the flitch. On the other hand, the dyestuff does not diffuse to the same extent in the radial and tangential direction. Therefore, when gluing the cross sections with radial or tangential sections alternatively, shadow effect caused by shading falls partially near the joints, and as a whole, lamined flitch seems to have a cubic pattern like a wickerwork (so called "ajiro" in Japanese).

Pigment may be added to the adhesive. However, since the pigment does not diffuse in any direction of the flitch, clear color remains at the lines of the joint.

For the purpose of giving the impression of a shadow to the flitch, water soluble stain such as alizarine red S and methylene blue or water insoluble stain such as Sudan II, azo type dyestuff and cyanine type dyestuff are used as a dyestuff to be added to the adhesive in the range of 0.1 to 10% by weight. In case of water insoluble dyestuffs, the latter is added to the adhesive after dissolving in a solvent miscible with water, for example, alcohol, acetone, or the like.

As regards the use of pigment, pigment such as titanium white, red iron oxide, chrome yellow, or the like is mixed with the adhesive, and even metallic powder such as gold dust may be used.

Following adhesive application in amount specified, flitches were placed in a clamp with the application of a pressure. After hours the clamp were removed and the composite flitches thus prepared are sliced by using slicer subsequently or after a short time while maintaining the moisture content at or above the $f.s.p.$.

Further to it, the composite flitches having a moisture content at or above the $f.s.p.$, in slicing can be simply sliced without difficulty. But the composite flitch having a moisture content below the $f.s.p.$ should go through the moistening steps described as above. And depending on the kinds of woods it is still desirable to moisten the wood in slicing, even if the wood has already have the moisture content above the $f.s.p.$. Though unnecessary to add, it is commonly known that in the case of using such a wood hard to slice as teak, rosewood, moabi, red oak and the like should be softened preliminarily by cooking or steaming.

The sliced veneer thus produced can be glued onto a substrate succesively just after slicing, but it is usual to glue it onto a substrate after storing for a period of time as may be necessary while taking care to keep them with same moisture content, the sliced veneer provided according to the aforementioned four steps is finally overlaid and glued onto a substrate or glued together to make a plywood by means of adhesive spread all over the surface of the substrate.

As for the substrate, wood, plywood, particle board, hard board, paper, plastic sheet, cement board, ceramic board, metallic board and so on are usable.

Although as regards the adhesive at this final step, such type as described above can be used, usual adhesive as employed in the field of plywood or fancywood also may be employable. Such adhesive may be mentioned following: thermosetting resin adhesive; phenol, resorcinol, urea, melamine, epoxy, unsaturated polyester, polyurethane, diallylphthalate, thermoplastic resin adhesive; PVA, polymethyl methacrylate, polystrene, polyvinyl acetal, polyvinyl butyral, methylcyano-acrylate, nylon, polyacetal, ethylene-vinyl-acetate copolymer, vinylacetate emulsion, urea-vinylacetate emulsion adhesive synthetic rubber; styrene-butadiene rubber, nitrile rubber, polychloroprene, polybutadine, polyisobutylene, polyisoprenisobutylene, thiokolgum, polyacrylate resin adhesive, composite polymer; polyvinyl acetate/phenol, nitrile rubber/phenol, neoprene/phenol, nylon/epoxy resin adhesive.

It is preferable to use an adhesive belonging to the group of thermoplastic resins such as vinyl acetate emulstion, ethylene-vinylacetate copolymer emulsion or mixtures of the same, and belonging to the group of thermosetting resins, such as mixtures of vinylacetate emulsion and urea resin, of ethylene-vinylacetate copolymer emulsion and phenolic resin.

At the time of gluing, a sheet of sliced veneer is glued onto the substrate in one operational step through a hotpress gluing process, and optionally, a plurality of sheets of sliced veneer may be used to obtain a large quantity of fancy board having artistic patterns.

In conclusion, carrying out this invention, i.e. putting all the steps at a moisture content at or above the $f.s.p.$ brings about the following effectivenesses;

1. Dividing logs longitudinally into flitches by using saw can be easily conducted.

2. Smoothing the gluing surface of the flitches of any thickness, for instance that of 500mm can be accomplished at a stretch by using saw or slicer.

3. Furthermore, the smoothed surface thus prepared can be kept completely unchanged by maintaining the moisture content at or above the *f.s.p.*.

4. Gluing individual flitches into composite flitch can be done completely and effectively with inconspicuous joint-lines, all of which proceed from the elasticity of the wood at elevated moisture content even if it has produced some distortion.

5. Sliccing at the elevated moisture content makes the operation easily and effectively.

6. Even in the case of the wood being hard to slice, distortion due to the occurrence of inner stress will not be produced by the repeating of steaming or cooking.

7. Besides the above, as this invention does not require the process of drying, steaming or cooking, there is no fear of getting warped of the wood due to the repeating of those processes.

Several embodiments of the process for producing a sliced veneer or a fancy board made therefrom on the basis of the present invention will be described as follows:

The First Embodiment (FIGS. 1–4)

Figure 2:
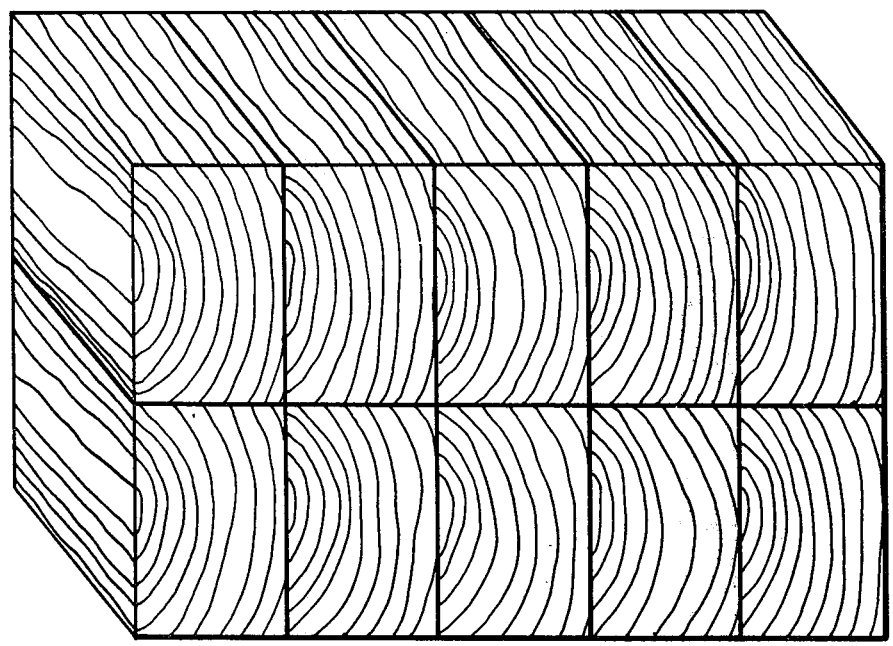
FIG. 2 is a perspective view of a laminated or composite flitch consisting of divided smaller flitches as related to the same embodiment.
Figure 3:
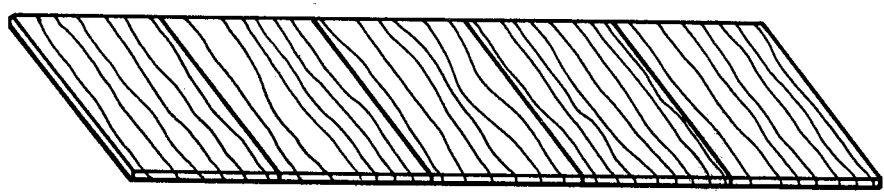
FIG. 3 is a perspective view of a sheet of veneer sliced horizontally from the laminated flitch in FIG. 2.
Figure 4:
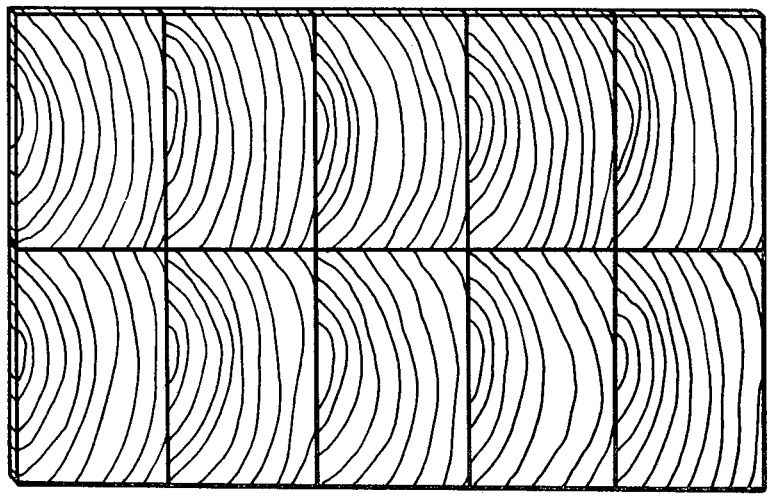
FIG. 4 is a perspective view of a sheet of veneer sliced vertically from the laminated flitch in FIG. 2.

Flitches are sawed off lengthwise from a log (80% moisture content) as shown in FIG. 1 and after smoothing the surface of flitches *a*, they are glued with epoxy resin adhesive to form a laminated flitch as shown in FIG. 2. Slices or sheets of veneer 0.2mm thick as shown in FIGS. 3 and 4 are obtained by slicing the thus obtained laminated flitch perpendicularly to the joined surface. All of the aforementioned processes are carried out with the moisture content more than *f.s.p.* and thus obtained veneer is maintained with the same moisture content condition.

The Second Embodiment (FIGS. 1, 5, 6 and 7)

The log in FIG. 1 (80% moisture content) was sawed longitudinally to make the following flitches as illustrated in FIG. 1;

two flitches *a* 90cm high, 65cm long and 55cm wide
two flitches *b* 90cm h., 65cm l. and 32cm w.
four flitches *c* 45cm h., 65cm l., and 10cm w.
two flitches *d* 45cm h., 65cm l., and 22cm w.
four triangular solids *e* (32/ $\sqrt{2}$) cm h., 65cm l. and 32 $\sqrt{2}$ cm base and one flitch *f* 26 cm h., 65 cm l, and 32cm w.

Figure 5:
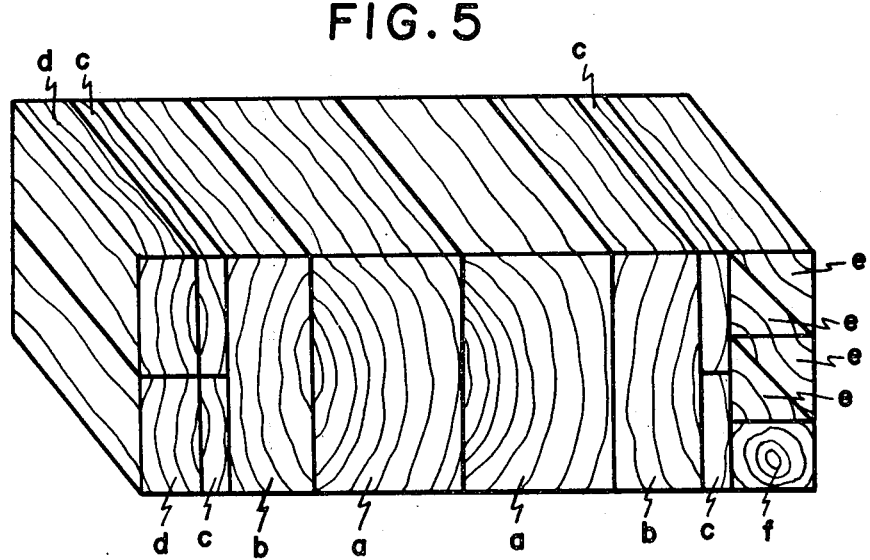
FIG. 5 is a perspective view of a laminated flitch as related to a second embodiment.
Figure 6:
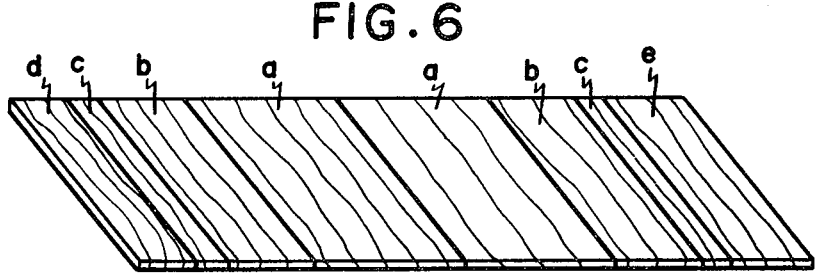
FIG. 6 is a perspective view of a sheet of veneer sliced horizontally from the laminated flitch in FIG. 5.
Figure 7:
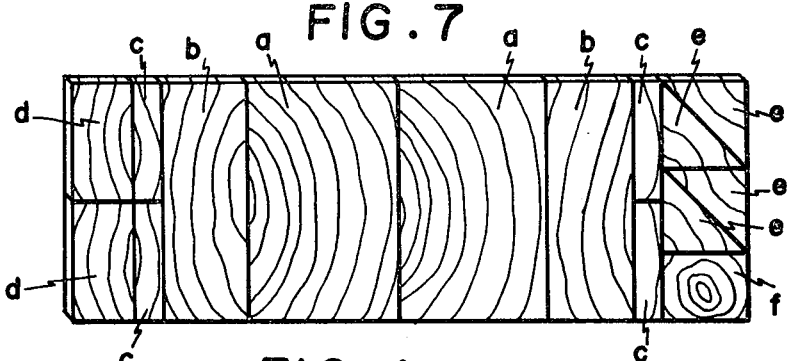
FIG. 7 is perspective view of a sheet of veneer sliced vertically from the laminated flitch in FIG. 5.

After smoothing the surfaces of these flitches, they are glued together with phenolic resin adhesive or polyurethane resin adhesive to form a laminated flitch having a size of 90cm high, 65cm long and 248 cm wide as shown in FIG. 5. The laminated flitch may be sliced along a hhorizontal plane or a vertical plane as viewed in FIG. 5 into a 0.1 to 0.8mm thick sheet to obtain veneer sheet as shown in FIGS. 6 and 7 in response to required pattern. There operations are carried out while the wood has a moisture content at or above the *f.s.p.* and the moisture content in the original lumber is maintained also in the finished veneers under the same moisture conditions.

Figure 8:
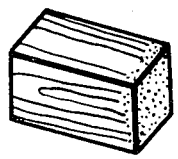
FIG. 8 is a perspective view of a flitch as related to a third embodiment.
Figure 9:
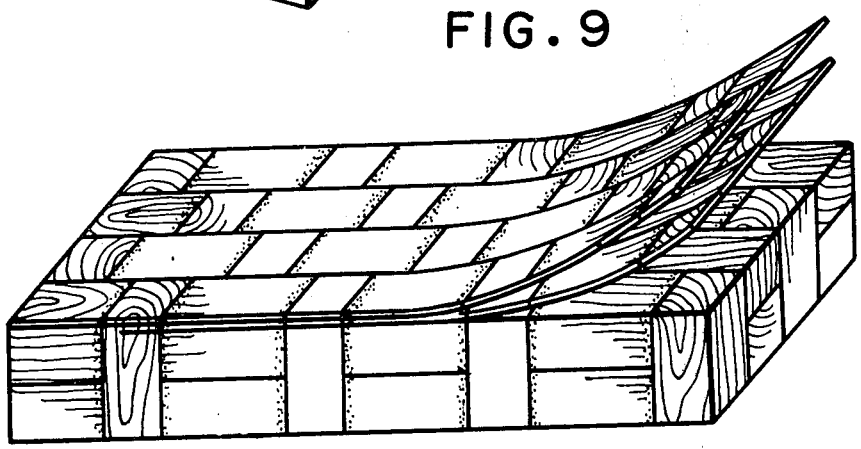
FIG. 9 is a perspective view of a laminated flitch consisting of a combination of flitches of the type shown in FIG. 8.
Figure 10:
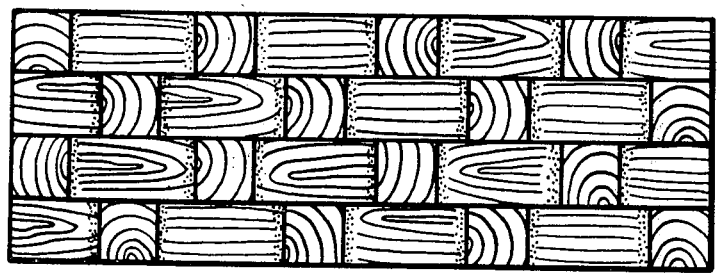
FIG. 10 is a plan view of a sheet of veneer sliced from the laminated flitch in FIG. 9.

The Third Embodiment (FIGS. 8–10)

Flitches as shown in FIG. 8 are sawed longitudinally from a log with a 120% moisture content and are arranged and combined with each other to obtain a laminated flitch as shown in FIG. 9 by using urea resin adhesive or epoxy resin adhesive in which 1% of Alizarine red S is added as a dyestuff. The top surface of the laminated flitch as seen in FIG. 9 consists of a combination of ranks or rows in which radial or tangential sections and cross sections of the sawed flitches are arranged alternately in an orderly manner, to obtain a pattern which looks like a kind of wickerwork pattern. All of the aforementioned steps are carried while the moisture in the lumber is maintained and veneers of 0.4mm thickness are sliced from the laminated flitch as in FIG. 9. In gluing the flitches together, dyestuff which is added to the adhesive diffuses longitudinally along the flitches almost from the cross section along the directiton of the fiber texture in the flitch as in FIG. 9, and therefore there is presented a cubic effect on the surface of the veneer shown in FIG. 10, which is created by the relationship between the radial sections having shaded parts caused by the dyestuff partly at the both ends and the colorless cross sections.

Figure 11:
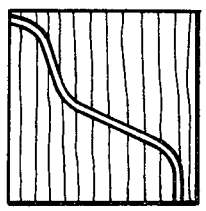
FIG. 11 is a plan view of a sheet of sliced veneer as related to a fourth embodiment.

The Fourth Embodiment (FIG. 11)

As shown in FIG. 11, curved flitches which are sawed from a log with a 35% moisture content are joined together by means of epoxy resin adhesive with 3% titanium dioxide. The joined flitch is sliced to make 0.3mm thick veneer sheets having a curved groove pattern. The same percentage of moisture content is maintained during the processing steps.

Figure 12:
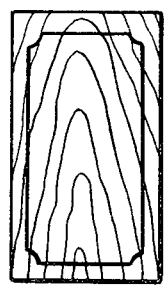
FIG. 12 is a plan view of a sheet of sliced veneer as related to a fifth embodiment.
Figure 17:
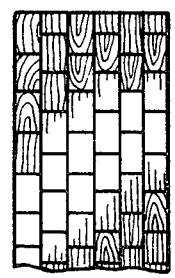
FIGS. 13, 14, 15, 16 and 17 are respectively plan views of various examples of sliced veneers as related to a sixth embodiment.
Figure 13:
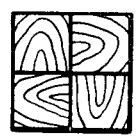
Figure 15:
Figure 14:

The Fifth Embodiment (FIG. 12)

As shown in FIG. 12, a sliced veneer may be provided with a groove in the form of a picture-frame pattern."

The Sixth Embodiment (FIGS. 13–17)

Various patterns or combination of patterns may be provided on the flitches as indicated in the prior embodiments and many different kinds of sliced veneers with different patterns can be formed. For example, the arrangement may include the grain pattern shown in FIG. 13 or FIG. 14, the V pattern shown in FIG. 15, the striped pattern shown in FIG. 16 and the laid-bricks pattern in FIG. 17.

Figure 18:
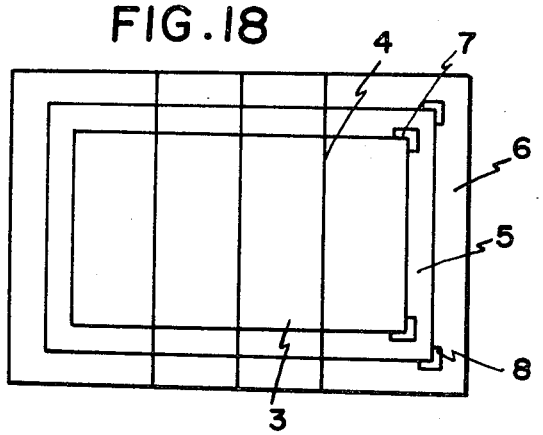
FIG. 18 is a plan view of a sheet of sliced veneer 3 overlaid onto a substrate 5 set on a working table 6 for making a fancy board according to a seventh embodiment and numeral 4 indicates joint line and 7 and 8 indicate stopper mark means.

The Seventh Embodiment (FIG. 18)

Figure 16:
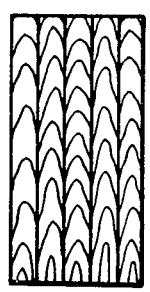

Sliced veneer at 3 in FIG. 18 having a striped pattern such as shown in FIG. 16 or in the other embodiments is overlaid onto a sheet of plywood using vinyl-acetate emulsion or epoxy resin as the adhesive and then grooves are made in the surface of the sliced veneer along the joint lines 4, thereby producing a fancy plywood, 6 indicates a working table, and 7 and 8 indicate stopper mark means.

Figure 19:
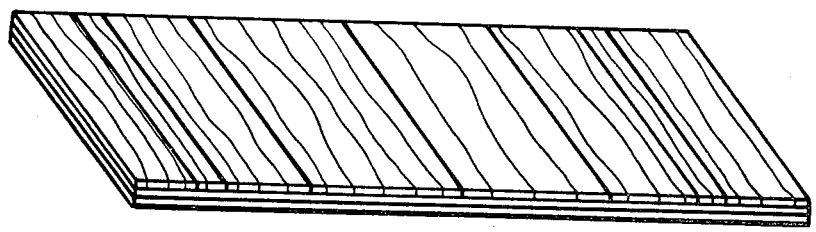
FIG. 19 is perspective views showing a finished fancy board overlaid with a sliced veneer as related to an eighth embodiment.

The Eighth Embodiment (FIGS. 6, 19)

FIG. 6 shows one of the sliced sheets of veneer as produced in the aforementioned embodiments glued onto a substrate of desireable size, for example plywood in this case, with vinylacetate emulsion being used as the adhesive employing the hot gluing process. FIG. 19 shows the sheet of veneer on the substrate. After slicing and during storage the moisture content of the veneer sheet is maintained. The aforementioned process may be used for producing fancy board. Wood, plywood, particle board, cement board, paper, plastic sheet, ceramic board or metallic board are examples of material which may be used as a substrate. For the adhesive, ethylene vinyl-acetate copolymer emulsion, a mixture of vinyl-acetate emulsion and urea resin may be used.

The Ninth Embodiment (FIGS. 20–27)

In case the broad sliced veneer which is flexible and equal in physical characters is required in the present invention, a composite flitch is first prepared from small individual flitches having varied coefficient of shrinkage arranged in the following manner:

(In this specification, the coefficient of shrinkage, means that of linear shrinkage in the direction of the line when flitches are arranged to form in line and is expressed by the following formula:

$$S = \frac{l_1 - l}{l_1} \times 100\%$$

in which
 $l_1$ =length of the flitch in the direction of the line at green condition.
 $l$ =length of the flitch in the direction of the line at moisture content of 15% of the above flitch.)

In case the composite flitch is composed of a single layer, that is, one or more rows of individual flitches are arranged on a level, individual flitches are so arranged as each subgroup of them has substantially the same average coefficient of shrinkage on a level, when they are divided into several subgroup one dimensionally or two dimensionally.

In case the composite flitch is composed of more than one layer and each layer have one or more rows of individual flitches, the flitches in each layer are arranged as above, so that the average coefficient of shringage of each subgroup is substantially the same when they are put into several subgroups in one or two dimensions.

After being arranged as above, the individual flitches are glued into a composite flitch, first by smoothing all faces and then by gluing them according to this invention. Such prepared composite flitch can be sliced directly into a veneer for plywood or thin veneer for fancy board, and rarely, so treated as cooking or steaming of wood prior to slicing.

The above mentioned steps, i.e., sawing, smoothing, preparation of a composite flitch and slicing, are carried out at the moisture content of the wood at or above the *f.s.p.* according to the process disclosed in the present invention.

Equilibration of shrinkage of flitches arranged according to the above-mentioned manner means to set an average coefficient of shrinkage of flitches for every subgroup of flitches to meet as indicated as follows.

FIG. 20 presents the perspective view of a laminated flitch composed of 9 small flitches arranged into 3 subgroups A, B and C. In order to have the coefficient of shrinkage in respective subgroup to be equilibrated, the following ways of arrangement can be suggested:

A. As shown in FIG. 21, each and every subgroup is composed of three individual flitches identical in size and shape, each having the following shrinkage: 7.3%, 5.2% and 3.8%, so that the average shrinkage of units, A, B and C, is equally 5.4%. The order in which the three flitches are placed in succession or in a subgroup is repeated in the remaining subgroups, and such distribution of woods is the most suitable for equilibration.

B. FIG. 22 shows an arrangement in which the three flitches in each subgroup as employed in (A) are placed in irregular order, but the average coefficient of shrinkage in each subgroup is approximately the same.

C. Flitches in FIG. 23 identical in size and shape but of different shrinkage, are placed in such order as to be grouped into subgroups A, B and C, whose average coefficient of shrinkage are substantially the same.

D. FIG. 24 shows an arrangement of flitches irregular in size, in such order that each subgroup consists of varied numbers of flitches, i.e., 2 flitches in subgroup A, 4 in subgroup B and C respectively, but has substantially the same weighted average of coefficient of shrinkage.

In case the flitches are arranged in two or more rows on a level, they are grouped into subgroup two-dimentionally and placed in such order as that the same average coefficient of shrinkage is brought to each subgroup. FIG. 25 for example, shows an arrangement in which two rows of flitches on a level, each consisting of 8 flitches, are grouped into subgroups A, B, C and D, and the coefficient of shrinkage of wood in each subgroup is equilibrated. The most preferably, the flitches of different shrinkage, e.g. 3.2, 11.4, 8.3 and 5.8% are distributed in the same order in respective subgroups as in FIG. 26, so that all subgroups have substantially the same average shrinkage. Again in this case the coefficient of shrinkage of a composite flitch is equilibrated by arranging individual flitches in such order as to bring the same average coefficient of shrinkage to each subgroup as in FIGS. 22, 23 and 24 correspondingly.

In case individual flitches are assembled in three dimensions, e.g. three rows of flitches are piled up as cubically, each row can be arranged to equilibrate the coefficient of shrinkage according to the above described.

Figure 27:
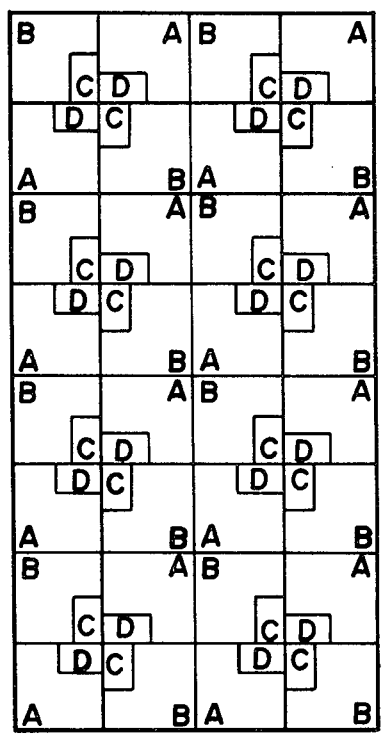
FIG. 27 is a plan view of a sliced veneer prepared according to the ninth embodiment.

By applying similar means and combining 4 flitches of different woods A, B, C and D, each having different coefficient of shrinkage as shown in FIG. 27, a sliced veneer having artistic pattern and evenness and stability in physical properties is obtained.

When a great amount of composite flitches are required for a large lot of sliced veneer having evenness in physical characters and suppleness, and equal sized composite flitches have varied average coefficient of shrinkage, each composite flitch is first prepared to equilibrate its average coefficient of shrinkage in the same manner as above described, and then all composite flitches are so corrected as to bring their average coefficient of shrinkage to be substantially equal by gluing such an additional small flitch for compensation as having a length of $x$ $$(x = \frac{b-a}{100} \times l)$$

to each composite flitch in which $a$ represents the least value of all the composite flitches' average coefficient of shrinkage, $b$ that of the composite flitch to which the additional flitch is to be glued for compensation, and $l$, the length thereof in the direction of the arrangement.

Finished veneer or thin veneer processed according to the present invention has various physical characters evenly, and is flexible and easily to handle causing no peeling, check, wave, raised grain and other similar defects, and can be usable as the first class veneer.

However, the greatest advantage of the process is to increase the yield of the product or fancy wood out of a raw wood, which yield could be raised by about 7% comparing with that by means of the conventional process due to the equality in length and width of the veneer which causes no unnecessary trimming. And, according to the process of the present invention, the production line could be automationalized.

The Tenth Embodiment (FIGS. 28–31)

Figure 28:
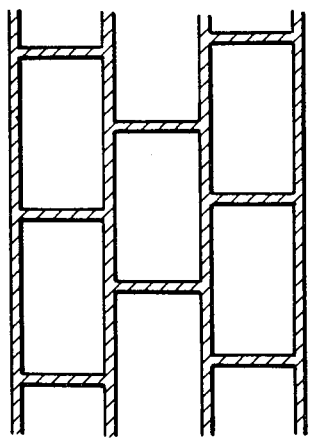
FIGS. 28, 29, 30 and 31 are respectively plan views indicating combination of flitches as related to a tenth embodiment.
Figure 29:
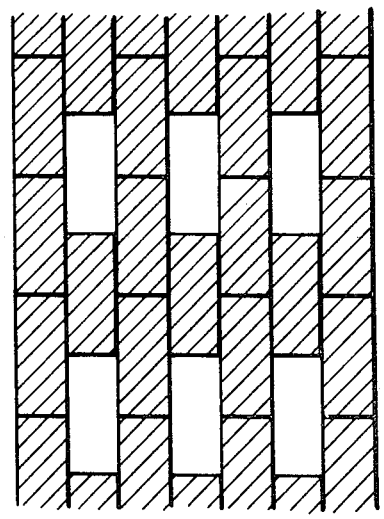
Figure 30:
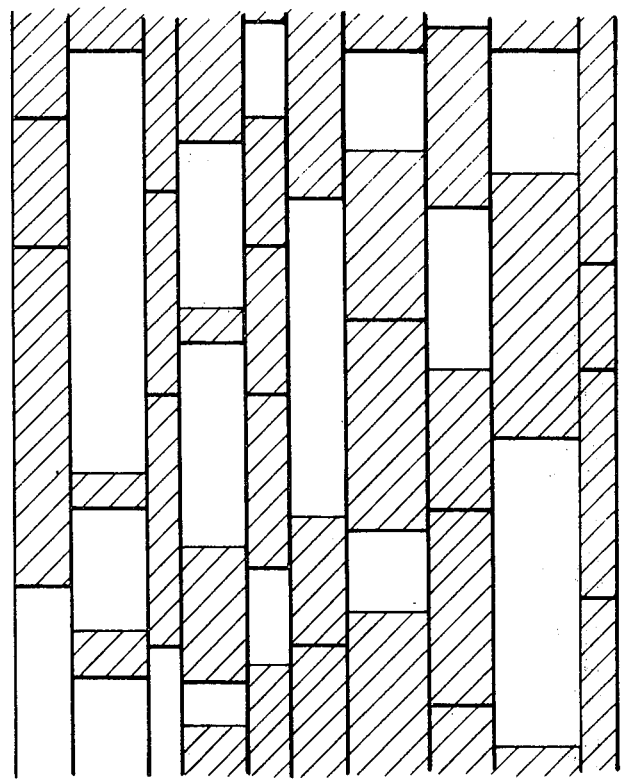
Figure 31:
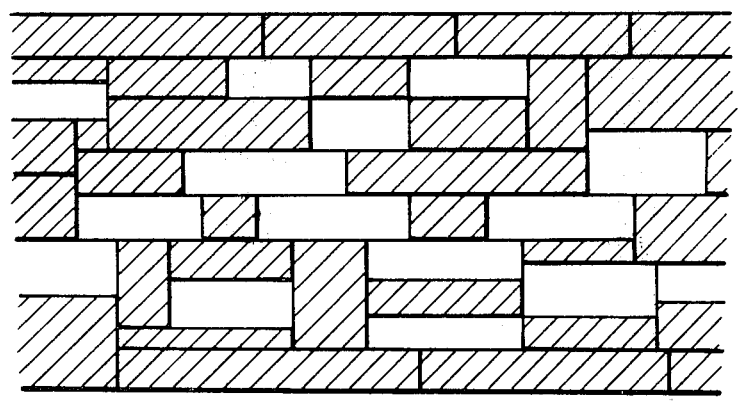

When sliced joining veneer which is difficult to split is required by joining and gluing individual flitches in accordance with this invention, individual flitches are arranged so that the flitches which split easily may be restricted somewhat by the flitches which are difficult to split by encompassing the former with the latter. Upon decision of mode of arrangement, all faces of the flitches are smoothed by slicer and glued by means of moisture-curing type adhesive such as urethane polymer adhesive to be made into the composite flitches which are sliced in the desired thickness to obtain veneer. The above process was carried out at the moisture content at or above the $f.s.p.$ The restriction of easily splitting flitches are imposed by surrounding them with the flitches which are difficult to split as shown in FIGS. 28 and 29 wherein bias portions represent the latter flitches and blank the former flitches. Such restrictions include the case where the latter are surrounded irregularly as shown in FIG. 30 or surrounded at least partially by the former as shown in FIG. 31. By taking such arrangement of flitches as above, the stress to be produced in easily splitting flitches upon drying can be eliminated as much as possible. Thus, the veneer obtained in such process is found to be difficult to split, even if it contains a portion or portions of wood which is apt to split. The kinds which aree easy to split in the process are: Kalopanax (*Kalopanax pictum*), ash (*Fraxinus japonica Blume*), Zelkova (*Zelkova serrata Makino*), teak (*Tectona gradis S.*), elm (*Ulmus daridiana planch*), Kokko (Albizzia Lebbeck Benth), red oak (*Quercus serrata*) and the like, the kinds which are hard to split in the process are: Saperre (*Entanprophragma Cylindricum*), Moabi (*Minusops Djave Engl*), American walnut (*Juglans sidebddiana*), Dao (*Dracontomelum dao Merr. and Rolfe*), rose wood (*Dysoxylum spp.*), birch (*Betura spp.*), camphor tree (*Cinnamomum camphora sieb.*), and the like. Of the same kine of wood, the veneer of tangential section is more apt to split than that of radial section from the view point of grain. Also within the same single tree, some parts are split more easily while the others are not.

Therefore, the hardness or easiness in splitting in the present invention includes such difference of hardness in the same kind of wood or in the same single wood.

The Eleventh Embodiment (FIGS. 32–35)

Figure 32:
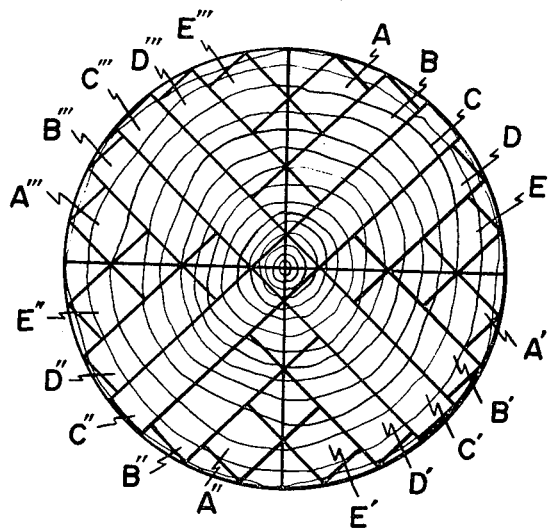
FIGS. 32 and 34 are end views respectively showing the dividing arrangement of a log and FIGS. 33 and 35 are perspective views of composite flitch from which sliced veneer are slicing as related to a eleventh embodiment.
Figure 33:
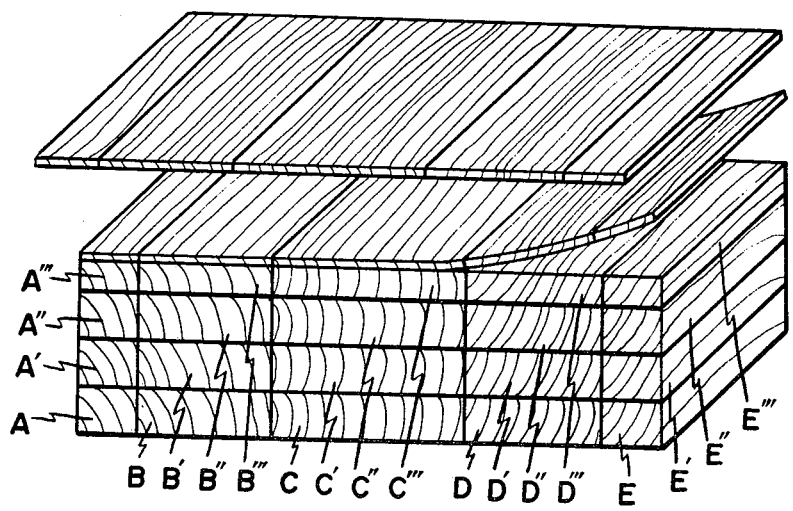
Figure 34:
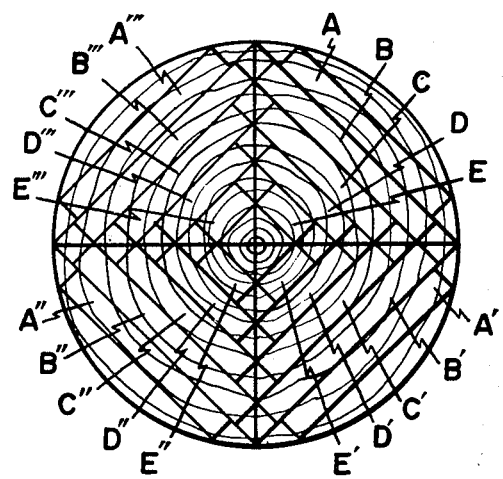
Figure 35:
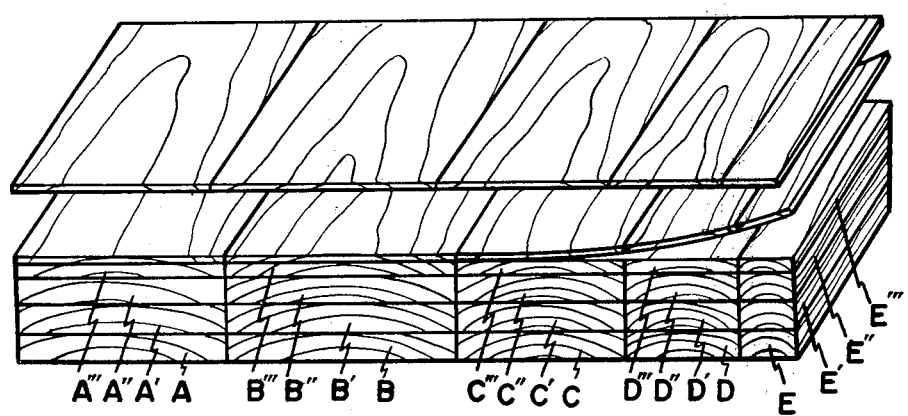

When a lot of wide sliced veneer having same pattern of grain are required according to this invention, a green log is sawn crosswise into desired length, and big flitches having a fan shaped section are obtained from the log by dividing them lengthwise radially from the center at the cross section of the log in equal $n$ portions as shown in FIG. 34 and FIG. 32 in which $n$ is 4, and subsequently each of these flitches is divided similarly lengthwise in tangetial direction as shown in FIG. 34 or in radial direction as shown in FIG. 32 at the cross section of the log in equal $m$ portions as shown in FIG. 34 and FIG. 32 in which $m$ is 5 to obtain small flitches which were sawn their curved portions off to form the small flitches of the maximum size of rectangular prism shaped and each small flitches thus obtained shall be laid down in line on a level in the order of A, B, C, D, ... and the correlative flitches to these, i.e. A', B', C', D', ..., A'', B'', C'', D'', ... and so on shall be respectively placed correspondingly on top in the same order as shown in FIGS. 35 or 33, then smoothing each gluing surface of the small flitches and gluing them by means of adhesive specified in this invention to obtain composite flitches, and finally by slicing the composite flitches horizontally by slicer, a lot of sliced veneer having the same pattern of grain, flatsawn grain by dividing lengthwise big flitches in tangential direction at the cross section and vertical grain by dividing lengthwise in radial direction at the cross section can be obtained, all the steps described above being carried out at a moisture content at or above the $f.s.p.$.

The Twelfth Embodiment (FIGS. 36–39)

Figure 36:
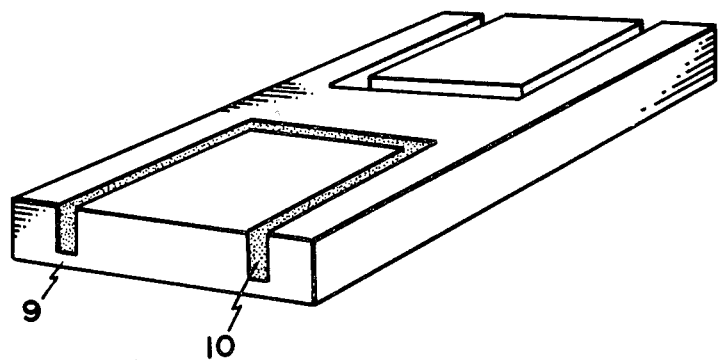
FIGS. 36 and 38 are respectively perspective views of flitch and FIGS. 37 and 39 are respectively perspective views of composite flitch as related to a twelfth embodiment in which numeral 9 shows a thin portion which is left and 10 shows grooves in which the oblique lined portion indicates adhesive with color.
Figure 38:
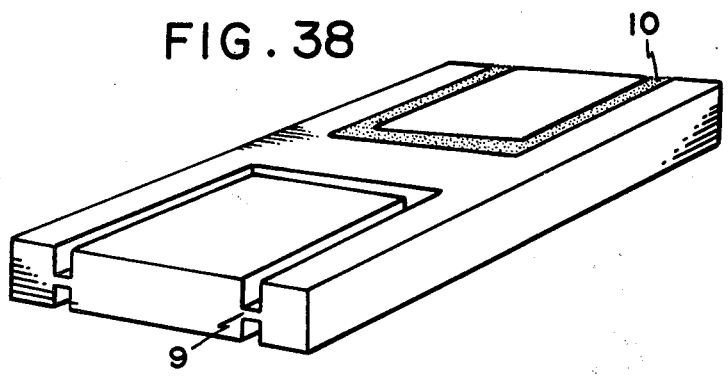

When sliced veneer having line pattern of grain is desired according to this invention, desired patterns are designed on the surface of either one side or both sides of the individual flitches and following thus designed pattern the groove 10 is hollowed out on either one side as shown in FIG. 36 or both sides as shown in FIG. 38 thereof bby using router or routing machine in such way that some thin portion 9 are left as integrated portion thereof and the following transparent or opaque filler are replenished into the described grooves 10 in the above Fig. which consist unique artistic line pattern after curing.

As the filler described above, the following can be employed thermosetting resin adhesive such as phenol, resorcinol, urea, melamine, epoxy, unsaturated polyester, polyurethane, diallylphthalate and the like; thermoplastic resin adhesive such as polyvinylacetate, polymethylacrylate, nylon, polyacetal and ethylenevinylacetate copolymer with or without pigments or dyestuffs. Inorganic powder such as wood meal, gold dust, powdered alminium, calcium carbonate and the like optionally may be respectively mixed with the described adhesive, and sheets such as paper, plastic film and metal sheet with coated adhesive on both sides may be also respectively employed.

As for the dyestuff, alizarin reds, methlene blue, Sudan II, azo type dyestuff and cyanine type dyestuff can be employed, which have been either dissolved or suspended in water or solvent respectively. Such pigments as titanium white, red iron oxide, chrome yellow and the like can be also employed.

Figure 37:
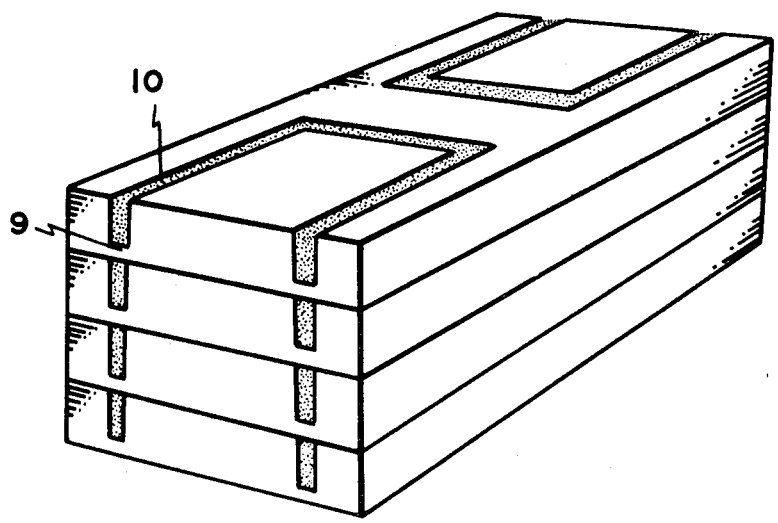
Figure 39:
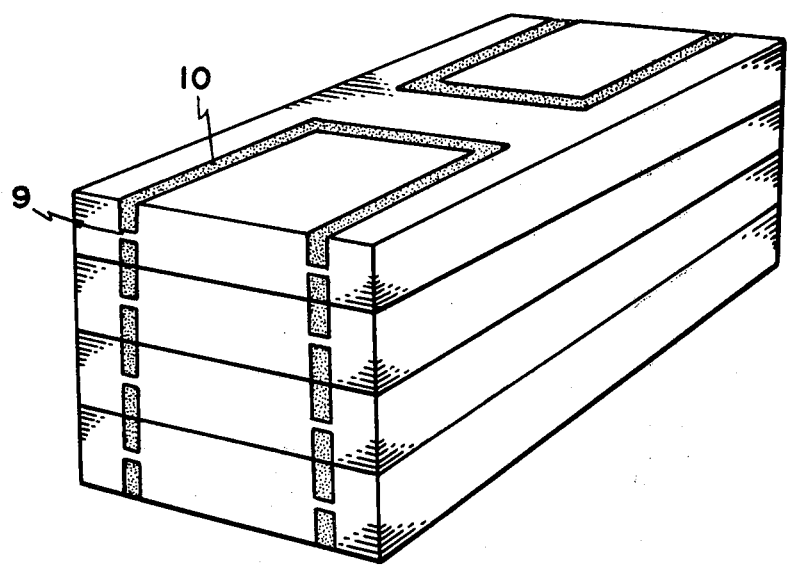

A plural number of individual flitches grooved according to the described manner are laid glued to form composite flitches as shown in FIGS. 37 and 39 and thereafter sliced in the same manner as mentioned above. The above all process is carried out at moisture content at or above the $f.s.p.$. In case the kind of wood employed or the thickness of a flitch cause difficulty in grooving, it is easier and more efficient to groove the patterns from the both sides of a flitch leaving a thin solid portion in the middle as shown in FIG. 38.

By bringing this method into operation, a novel and modern line pattern of grain which is entirely different from that of the prior art can be obtained.

The Thirteenth Embodiment (FIGS. 40–77)

For years forest trees have been indiscriminately felled in quantity, which resulted in a shortage of large trees. Consequently, the plywood production from slender trees has been increasing and the total production for this purpose becomes low both in output and productivity. Domestic woods which has fine grains to finish are greatly demanded, and the prices are therefore high. The output of large woods in abroad has also a tendency to decrease, and it is causing an increase in the price of large wood.

In veneer production, the peeling of raw woods by means of "rotary-lathed" is used hitherto which can be produced at a low cost and high yield, so that large raw woods are desirable in that process. When a wood is rotary-lathed, it should be fixed with a spindle at which a chucked portion of the wood — i.e. in a radius approximately 12cm of the heart of the wood — is left out uselessly. Moreover, the heart of a large tree is often decayed which portion is called "punky" and such heartwoood in a radius about 16–30cm is not usable. Consequently, the necessity for large woods becomes more increased for rotary-lathing.

The present invention also introduces a process by which a large size veneer can be produced from small wood or too large wood at high efficiency and yield, and the product is found even better in quality than that from a large wood. Large woods which have been chiefly employed for the conventional plywood production are about 50 to 100 years old, having a diameter of 75 to 80cm. On the other hand, in this invention smaller and younger woods of 10 to 15 years old having a diameter of 30 – 40cm allow faster turn over rate, and therefore greater harvest in the production of woods can be expected on a given area and for a given period of time. Thus by carrying out this invention, limited natural resources, forest resources, can be turned into endless resources.

In making the best use of the woods of small size or too large size according to this invention, supplementary blocks or boards are glued onto the round logs or the arc portion of the log to form the square flitch.

Thus prepared flitches are subsequently glued together in a row or more after smoothing their gluing surface to form composite flitches which are sliced to obtain a veneer of large area. Throughout the process described above, whole steps are carried out while maintaining the moisture content of the wood above the $f.s.p.$, which is the major subject matter of this invention.

As for the joining of supplementary block or board herein used, following means are used:

1. Ordinary triangular prism shaped blocks are glued on the flat surface of the log prepared by using saw or slicer.

Figure 57:
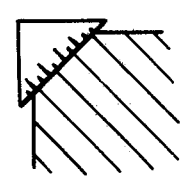

2. Triangular prism shaped blocks having the substantially triangular cross section of which base is arched one having the radius of curvature conformed with that of the arched cross section of the round or partly round log, natural or prepared by using rotary lathe, are glued on the arched portion. The arched base of the triangular prism shaped blocks preferably have a plurality of longitudinal incisions perpendicular to the arched surfaces of the arched portion as shown in FIG. 57.

Figure 55:
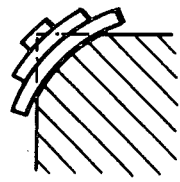

3. By applying cold-pressure process, a plurality of planks, boards, or veneers are glued horizontally in layers on the flat portion or the arched portion of the logs as shown in FIG. 55.

Figure 56:
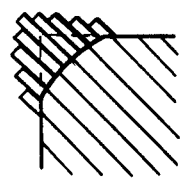

4. A plurality of planks, boards, or veneers are glued vertically in piles on the flat portion or the arched portion of the logs as shown in FIG. 56.

The word "gluing of the supplementary block or board" hereinafter described will include the above four means.

Figure 47:
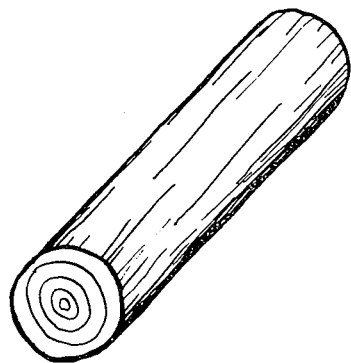
Figure 48:
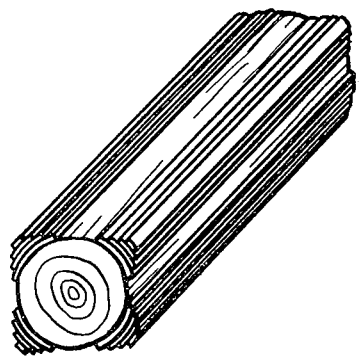
Figure 49:
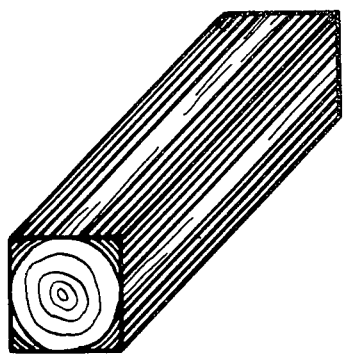
Figure 50:
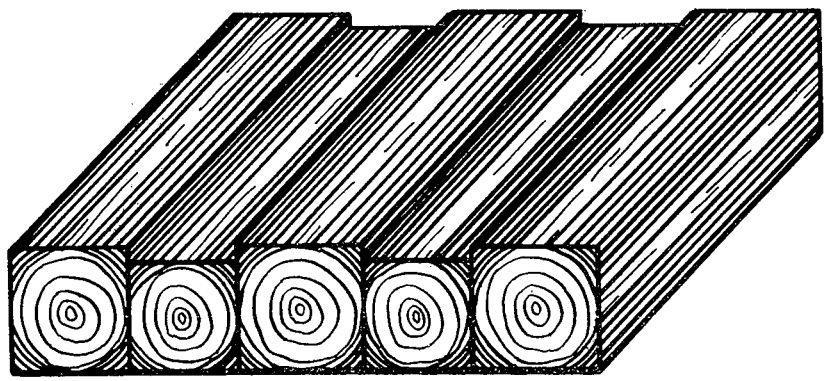

To obtain the composite flitches from individual flitches, following ways of combination are usable:

1. Supplementary blocks or boards are glued onto the barkpeeled and smoothed surface of the naturally round log to yield substantially square timber as shown in FIGS. 47 and 48, which are sawn or sliced into exactly rectangular prism as shown in FIG. 49. Thus prepared rectangular prism, i.e. individual flitch is glued together in a row or more to form the composite flitch as shown in FIG. 50.

Figures 51, 52:
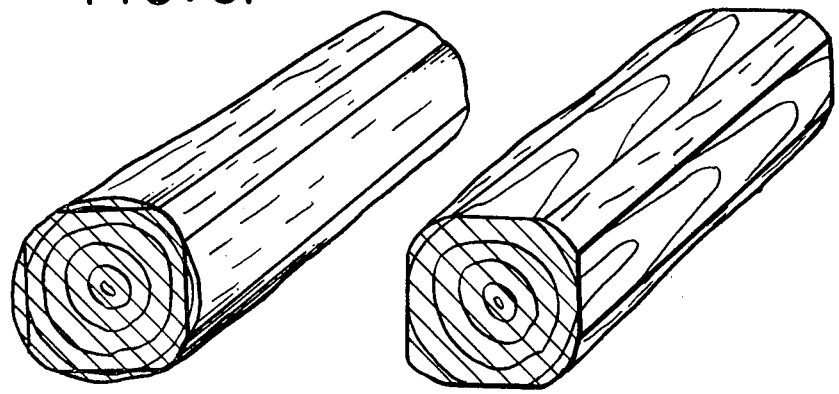
Figure 53:
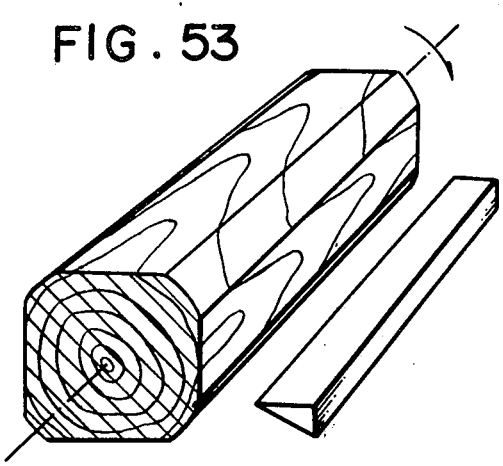
Figure 54:
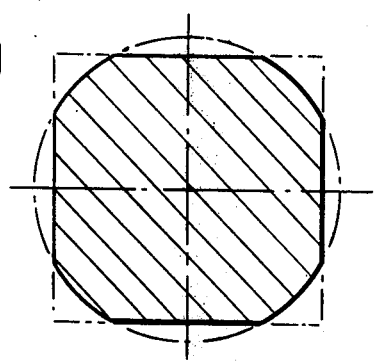

2. A raw log is sawn or sliced lengthwise into a roughly square flitch in such way that the cross section of the wood has four rectangular sides equidistant from the center of the wood whose two opposite sides being in parallel with each other and that the four corners are remained uncut as shown in FIGS. 51 and 52. The above four uncut corners are rounded off by using, for example, rotary lathe until the four arc portions having the equal radius of curvature are brought on the cross section of the flitch as shown in FIGS. 53 and 54. Supplementary blocks or boards are glued onto the four rounded corners respectively as shown in FIGS. 55, 56 and 57. The edges thus formed as shown in FIG. 58 as an example are sawn or sliced so as to form square flitches as shown in FIG. 59 which glued together in a row or more to make the composite flitch as shown in FIG. 60. Thus prepared composite flitch can be sliced into wide sheets of veneer as shown in FIG. 61.

Figure 62:
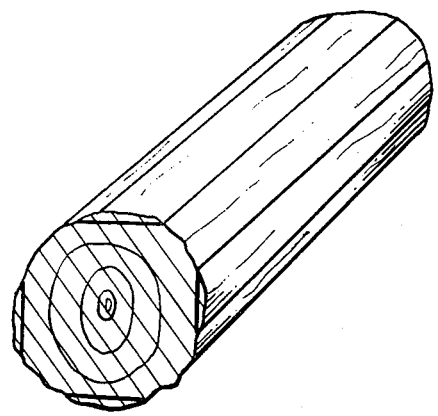
Figure 63:
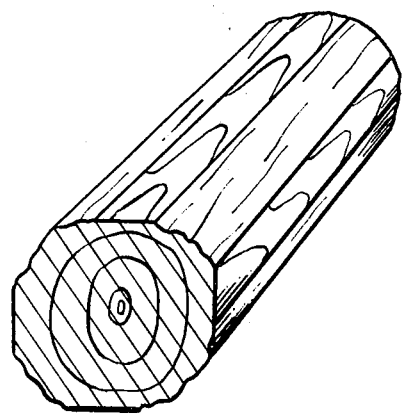
Figure 64:
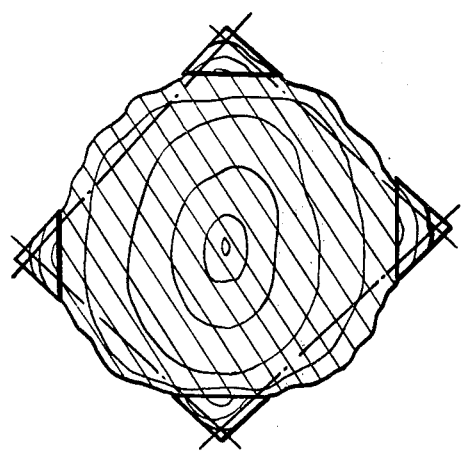
Figure 65:
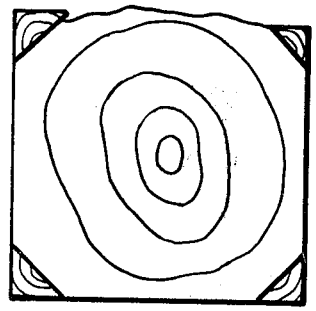
Figure 66:
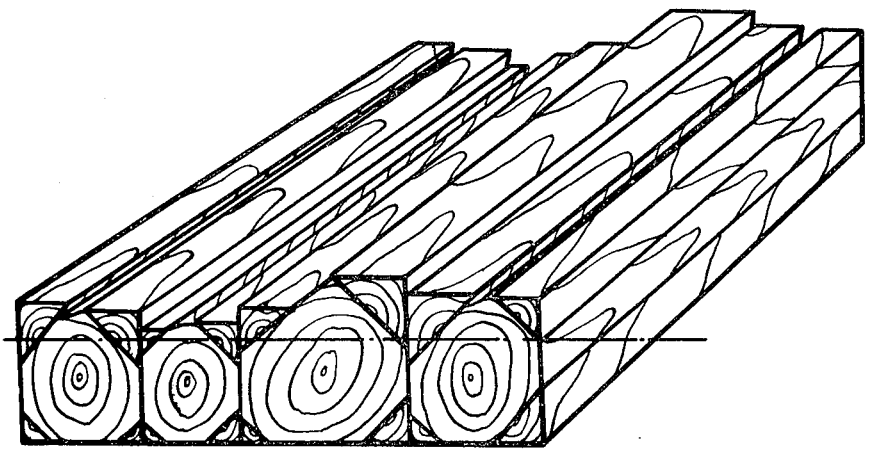

3. a. A raw log is sawn or sliced lengthwise to make a rough polyhedron in such way that the raw log can be utilized to its maximum degree in which polyhedron means such one having uncut side faces, for example, in the case of octahedron that having four side faces uncut alternately as shown in FIGS. 62 and 63. Supplementary triangular prism shaped blocks are glued onto the flat surface of the polyhedron to form substantially square flitches as shown in FIG. 64 which is sawn or sliced into exact square flitches so as to produce square cross section having the maximum area with one face remained uncut as shown in FIG. 65. A desired number of the above prepared flitches of various size are so arranged that the uncut side of each flitch comes to the top and after smoothing the gluing surface they are glued together to form the composite flitch with uneven surface being in upside as shown in FIG. 66.

Figure 40:
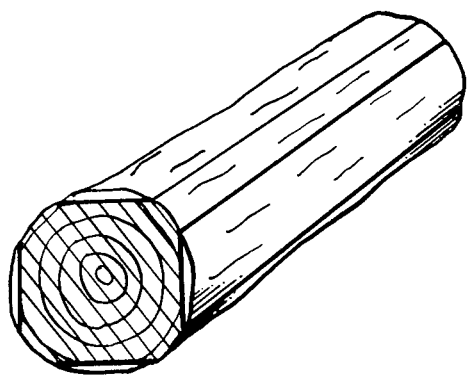
FIGS. 40, 41, 42, 47, 48, 49, 51, 52, 53, 62, and 63 are respectively perspective views indicating preparing of flitches.
Figure 41:
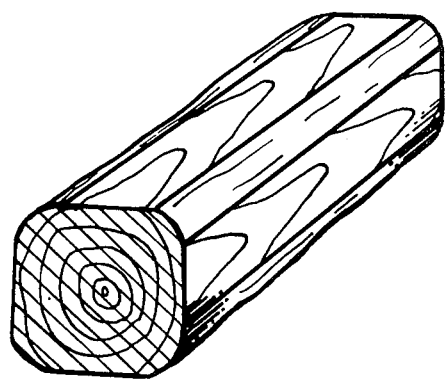
Figure 42:
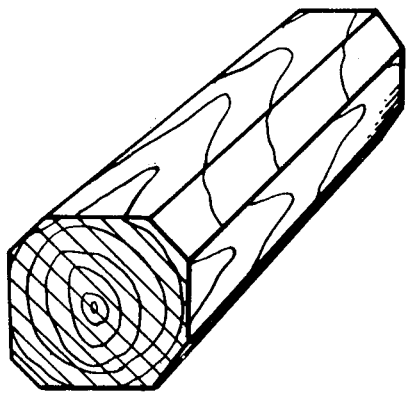
Figure 43:
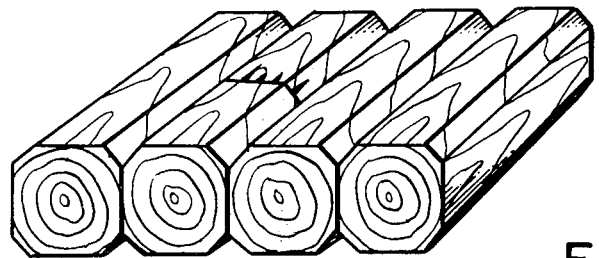
Figure 44:
Figure 45:
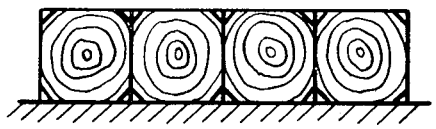
Figure 46:
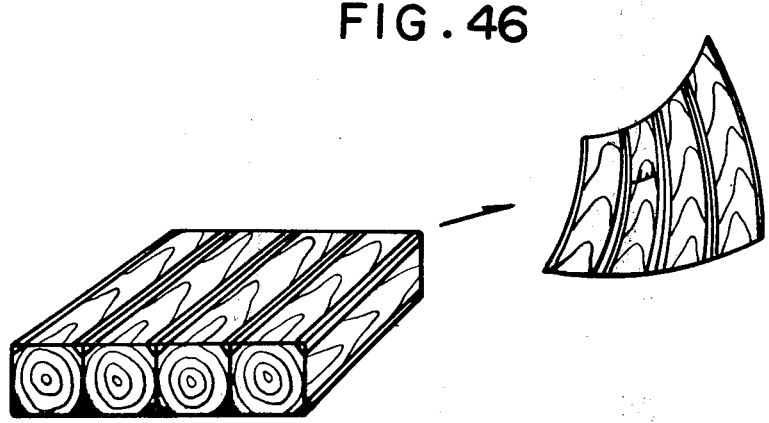
Figure 68:
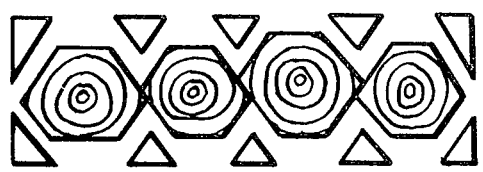
Figure 67:
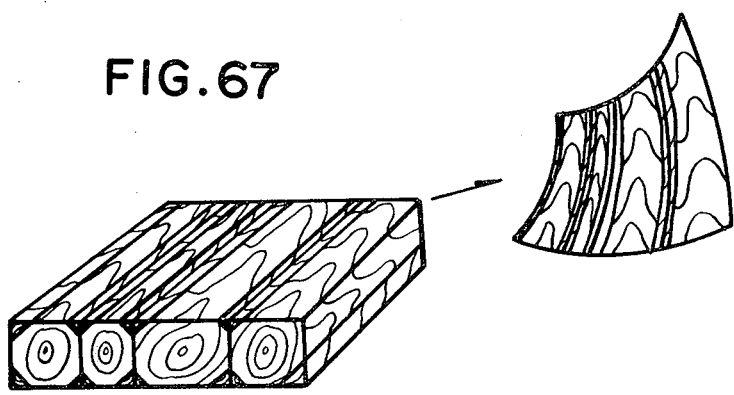

Such prepared composite flitch is fixed by the slice chuck and smoothed its uneven surface by circular saw or slicer in order to obtain the flat square flitch, and then the flat square flitch thus obtained is sliced into sheets of veneer of desired thickness as shown in FIG. 67. The above process is carried out entirely at moisture content at or above the $f.s.p.$ and in which process specified adhesive such as epoxy resin and urethane resin described above is employed.

b. A raw log is sawn or sliced length wise to make into a polyhedron flitch as shown in FIGS. 40, 41 and 42 in order. (in this case, polyhedron is indicated as octahedron.) Then, a desired number of the above prepared flitches in the same size are arranged in a row facing side to side, and the interface of the respective flitches are smoothed and glued to make a composite flitch as shown in FIG. 43. Thereafter, supplementary triangular prism shaped blocks are inlaid and glued into the openings between each flitch as shown in FIG. 44. In this case, the blocks are preferably of the entire length of wood, but short ones can be used by joining at the ends. The above is smoothed and sliced into wide sheets of veneer according to this invention as described above which is shown in FIGS. 45 and 46.

c. In making individual flitch, a raw log is sawn or sliced into hexahedron shaped flitch which interior angle 120° makes each flitch easy to arrange and insert supplementary blocks as shown in FIG. 68. thereafter all steps are took as described above.

4. In case of using too large logs as the raw log, it would be wasteful to use them as they are. So in this case, such logs are sawn lengthwise into two or more blocks to form the halved or quartered log and so on (FIGS. 69 and 73) which surfaces are smoothed or rounded by means of sawing, slicing, or rotary-lathing. Then, the supplementary blocks or boards are glued onto the flat or arched surface to form the roughly square prism shaped flitch as shown in FIGS. 70, 71, 74, and 75 in order. A desired number of the above flitches of various size are glued together in a row or more to form the composition flitch as shown in FIGS. 72 and 76, from which a veneer of wide area can be sliced according to this invention described above.

5. When unevenness of the top surface takes place by using different sized individual flitches to make a composite flitch, supplementary flitches of square prism are bound to make up the balance of height to the highest one as shown in FIG. 77 by which the uniform height and consequently the fullest utilization thereof can be expected. In addition to this, in the step of slicing, some parts of the composite flitch must be left without being sliced because clamping at th slice-chuck needs some parts and besides, when slicing gets nearer to a close and the thickness of the flitch becomes less and less, they are apt to warp due to the clamp pressure whereby causes correct slicing to be impossible. In accordance with this invention, these remained portions can be made available after they are glued onto the whole composite flitches of the following lot of operation. Alternatively, when composite flitches are subjected to be slicing, some splints by which the flitches are clamped to the slicer, are bound to them whereby waste of woods as described above can be avoided.

Thus, by carrying out this invention the yield of the plywood from the raw log will increase by at least 20 percent, which corresponds to the wood of 3,240 thousand cubic meter in Japan and natural forest resources amount to 320 million dollar will be put to good use efficiently.

What is claimed is:

1. A process for producing wood veneer comprising the steps of sawing a log into a plurality of individual flitches, smoothing the surfaces of the flitches which are subsequently to be glued, applying an adhesive to the smoothed surfaces of the flitches, gluing said flitches at said adhesive-bearing surfaces to form a composite flitch, and slicing said composite flitch to the desired thickness to produce a veneer, throughout the process all of said steps being carried out while maintaining the moisture content of said wood flitches at or above the fiber saturation point, said composite flitch being obtained by arranging said individual flitches into subgroups such that each subgroup has substantially the same average coefficient of shrinkage on a level when they are divided into several subgroups one dimensionally or two dimensionally, whereby there is obtained evenness of the various physical characteristics of the sliced veneer produced.

2. A process according to claim 1 further including gluing additional small flitches for compensation to the composite flitches which have a larger coefficient of shrinkage compared with that having the least coefficient of shrinkage.

3. A process for producing wood veneer comprising the steps of sawing a log into a plurality of individual flitches, smoothing the surfaces of the flitches which are subsequently to be glued, applying an adhesive to the smoothed surfaces of the flitches, gluing said flitches at said adhesive-bearing surfaces to form a composite flitch, and slicing said composite flitch to the desired thickness to produce a veneer, throughout the process all of said steps being carried out while maintaining the moisture content of said wood flitches at or above the fiber saturation point, said composite flitch being obtained by arranging said individual flitches which are made so that the flitches which split easily may be at least restricted by the flitches which are difficult to split by means of encompassing the former with the latter.

4. A process according to claim 3 wherein said flitch which splits easily is one or more flitches selected from the group consisting of Kalopanax, ash Zelkova, teak, elm, Kokko and red oak and wherein said flitch which is difficult to split is one or more flitches selected from the group consisting of Saperre, Moabi, American walnut, Dao, rose wood, birch and camphor tree.

5. A process for producing wood veneer comprising the steps of sawing a log crosswise into desired length, dividing said sawn log lengthwise radially from the center at the cross section of the log in equal $n$ portions (in which $n$ is an integer), subsequently dividing each of these portions similarly lengthwise in a tangential direction or in a radial direction at the cross section of the log in equal $m$ portions (in which $m$ is an integer) to obtain small flitches, sawing curved portions off to form the small flitches of the maximum size of a rectangular prism, laying down said small rectangular flitches obtained from one of said $n$ portions in side by side relationship and placing correspondingly the correlative flitches of the subsequent portion thereupon in the relatively same order as above, smoothing each gluing surface of the small flitches, applying an adhesive to the smoothed surfaces of said flitches, gluing said flitches at said adhesive-bearing surfaces to form a composite flitch, and slicing said composite flitch to the desired thickness to produce a veneer, throughout the process all of said steps being carried out while maintaining the moisture content of said wood flitches at or above the fiber saturation point, whereby a lot of sliced veneer having the same grain pattern, flatsawn grain by dividing said portion in a tangential direction and vertical grain in a radial direction is obtained.

6. A process for producing wood veneer comprising the steps of sawing a log into a plurality of individual flitches, smoothing the surfaces of the flitches which are subsequently to be glued, applying an adhesive to the smoothed surfaces of the flitches, gluing said flitches at said adhesive-bearing surfaces to form a composite flitch, and slicing said composite flitch to the desired thickness to produce a veneer, throughout the process all of said steps being carried out while maintaining the moisture content of said wood flitches at or above the fiber saturation point, said composite flitch being obtained by arranging and gluing supplementary blocks onto a bark-peeled and smoothed surface of a naturally round small sized log to yield a substantially square timber, sawing said square timber into exact rectangular prisms, and gluing said prisms to form said composite flitch.

7. A process for producing wood veneer comprising the steps of sawing a log into a plurality of individual flitches, smoothing the surfaces of the flitches which are subsequently to be glued, applying an adhesive to the smoothed surfaces of the flitches, gluing said flitches at said adhesive-bearing surfaces to form a composite flitch, slicing said composite flitch to the desired thickness to produce a veneer, throughout the process all of said steps being carried out while maintaining the moisture content of said wood flitches at or above the fiber saturation point, said composite flitch being obtained by sawing lengthwise a small sized log in such a way that the cross section of the wood has four rectangular sides and that four corners remain uncut, rounding off the said four corners by using a rotary lathe, gluing supplementary blocks onto said four rounded corners, sawing the edges to form sqaure prism flitches, and gluing said square prism flitches to make the composite flitch.

8. A process for producing wood veneer comprising the steps of sawing a log into a plurality of individual flitches, smoothing the surfaces of the flitches which are subsequently to be glued, applying an adhesive to the smoothed surfaces of the flitches, gluing said flitches at said adhesive-bearing surfaces to form a composite flitch, and slicing said composite flitch to the desired thickness to produce a veneer, throughout the process all of said steps being carried out while maintaining the moisture content of said wood flitches at or above the fiber saturation point, said composite flitch being obtained by sawing lengthwise a small sized log to make a rough octagonal prism, gluing supplementary triangular prism blocks onto the flat surface of said octagonal prism to form a substantially square prism flitch, sawing said flitch into exact square prism flitches with one face remaining uncut, arranging said square prism flitches with said uncut side up, smoothing the gluing surface, and gluing said square prism flitches to form the composite flitch.

9. A process for producing wood veneer comprising the steps of sawing a log into a plurality of individual flitches, smoothing the surfaces of the flitches which are subsequently to be glued, applying an adhesive to the smoothed surfaces of the flitches, gluing said flitches at said adhesive-bearing surfaces to form a composite flitch, and slicing said composite flitch to the desired thickness to produce a veneer, throughout the process all of said steps being carried out while maintaining the moisture content of said wood flitches at or above the fiber saturation point, said composite flitch being obtained by sawing a small sized log into polygonal prism flitches, arranging said same sized polygonal prism flitches in a row facing side to side, smoothing the interface of said polygonal prism flitches, and gluing said polygonal prism flitches along with supplementary triangular prisms into the openings between each flitch to form the composite flitch.

10. A process for producing wood veneer comprising the steps of sawing a log into a plurality of individual flitches, smoothing the surfaces of the flitches which are subsequently to be glued, applying an adhesive to the smoothed surfaces of the flitches, gluing said flitches at said adhesive-bearing surfaces to form a composite flitch, and slicing said composite flitch to the desired thickness to produce a veneer, throughout the process all of said steps being carried out while maintaining the moisture content of said wood flitches at or above the fiber saturation point, said composite flitch being obtained by sawing a small sized log into hexagonal prism flitches, arranging said hexagonal prism flitches side by side, and inserting and gluing supplementary blocks thereto to form the composite flitch.

11. A process for producing wood veneer comprising the steps of sawing a log into a plurality of individual flitches, smoothing the surfaces of the flitches which are subsequently to be glued, applying an adhesive to the smoothed surfaces of the flitches, gluing said flitches at said adhesive-bearing surfaces to form a composite flitch, and slicing said composite flitch to the desired thickness to produce a veneer, throughout the process all of said steps being carried out while maintaining the moisture content of said wood flitches at or above the fiber saturation point, said composite flitch being obtained by sawing lengthwise two large logs into two or more blocks to form halved or quartered logs, smoothing or rounding the surfaces of said blocks, gluing supplementary blocks or boards onto the arched surfaces to form roughly square prisms, and gluing said square prisms to form the composite flitch.

12. A process for producing wood veneer comprising the steps of sawing a log into a plurality of individual flitches, smoothing the surfaces of the flitches which are subsequently to be glued, applying an adhesive to the smoothed surfaces of the flitches, gluing said flitches at said adhesive-bearing surfaces to form a composite flitch, and slicing said composite flitch to the desired thickness to produce a veneer, throughout the process all of said steps being carried out while maintaining the moisture content of said wood flitches at or above the fiber saturation point, said composite flich being obtained by correcting unevenness of a top surface which is caused by using different sized individual flitches by means of binding supplementary flitches of square prism configuration to make up the balance of height to the highest flitch, whereby uniform height and consequently fullest utilization thereof is obtained.

13. A process for producing wood veneer comprising the steps of sawing a log into a plurality of individual flitches, smoothing the surfaces of the flitches which are subsequently to be glued, applying an adhesive to the smoothed surfaces of the flitches, gluing said flitches at said adhesive-bearing surfaces to form a composite flitch, and slicing said composite flitch to the desired thickness to produce a veneer, throughout the process all of said steps being carried out while maintaining the moisture content of said wood flitches at or above the fiber saturation point, said adhesive being one or more adhesives selected from the group consisting of underwater curing type polyurethane adhesive and moisture-curing epoxy resin adhesive.

14. A process for producing wood veneer comprising the steps of sawing a log into a plurality of individual flitches, smoothing the surfaces of the flitches which are subsequently to be glued, applying an adhesive to the smoothed surfaces of the flitches, gluing said flitches at said adhesive-bearing surfaces to form a composite flitch, and slicing said composite flitch to the desired thickness to produce a veneer, throughout the process all of said steps being carried out while maintaining the moisture content of said wood flitches at or above the fiber saturation point, said adhesive being such an adhesive as cured to develop adhesiveness by reacting with water.

15. A process for producing wood veneer comprising the steps of sawing a log into a plurality of individual flitches, smoothing the surfaces of the flitches which are subsequently to be glued, applying an adhesive to the smoothed surfaces of the flitches, gluing said flitches at said adhesive-bearing surfaces to form a composite flitch, and slicing said composite flitch to the desired thickness to produce a veneer, throughout the process all of said steps being carried out while maintaining the moisture content of said wood flitches at or above the fiber saturation point, said adhesive being such an adhesive as cured to develop adhesiveness even in the presence of moisture.

16. A process for producing wood veneer comprising the steps of sawing a log into a plurality of individual flitches, smoothing the surfaces of the flitches which are subsequently to be glued, applying an adhesive to the smoothed surfaces of the flitches, gluing said flitches at said adhesive-bearing surfaces to form a composite flitch, and slicing said composite flitch to the desired thickness to produce a veneer, throughout the process all of said steps being carried out while maintaining the moisture content of said wood flitches at or above the fiber saturation point, said step of smoothing being performed by using a circular saw with fine teeth.

17. A process for producing wood veneer comprising the steps of sawing a log into a plurality of individual flitches, smoothing the surfaces of the flitches which are subsequently to be glued, applying an adhesive to the smoothed surfaces of the flitches, gluing said flitches at said adhesive-bearing surfaces to form a composite flitch, and slicing said composite flitch to the desired thickness to produce a veneer, throughout the process all of said steps being carried out while maintaining the moisture content of said wood flitches at or above the fiber saturation point, said step of smoothing being performed by using a slicer.

18. A process for producing wood veneer comprising the steps of sawing a log into a plurality of individual flitches, smoothing the surfaces of the flitches which are subsequently to be glued, applying an adhesive to the smoothed surfaces of the flitches, gluing said flitches at said adhesive-bearing surfaces to form a composite flitch, and slicing said composite flitch to the desired thickness to produce a veneer, throughout the process all of said steps being carried out while maintaining the moisture content of said wood flitches at or above the fiber saturation point, said step of slicing being performed by using a slicer without the necessity of any cooking or steaming prior thereto.

19. A process for producing wood veneer comprising the steps of sawing a log into a plurality of individual flitches, smoothing the surfaces of the flitches which are subsequently to be glued, applying an adhesive to the smoothed surfaces of the flitches, gluing said flitches at said adhesive-bearing surfaces to form a composite flitch, and slicing said composite flitch to the desired thickness to produce a veneer, throughout the process all of said steps being carried out while maintaining the moisture content of said wood flitches at or above the fiber saturation point, said step of preparing the composite flitch further comprising designing a desired pattern on the surface of either one side or both sides of the individual flitches, hollowing out a groove following the thus designed pattern on the said surfaces thereof by using a router, and placing a transparent or opaque filler into said grooves, whereby a desired artistic line pattern is obtained.

* * * * *